(12) United States Patent
Choo et al.

(10) Patent No.: US 12,547,207 B2
(45) Date of Patent: Feb. 10, 2026

(54) DISPLAY WITH GATE DRIVER CIRCUITRY CONTROLLED BY TRUE AND COMPLEMENTARY CLOCK SIGNALS

(71) Applicant: Apple Inc., Cupertino, CA (US)

(72) Inventors: Gihoon Choo, San Jose, CA (US); Tsung-Ting Tsai, San Jose, CA (US); Shyuan Yang, San Jose, CA (US); Abbas Jamshidi Roudbari, Saratoga, CA (US); Chin-Wei Lin, San Jose, CA (US); Mao-Hsun Cheng, San Diego, CA (US); Salman Kabir, Campbell, CA (US); Ting-Kuo Chang, San Jose, CA (US); Warren S Rieutort-Louis, Cupertino, CA (US); Yuchi Che, Santa Clara, CA (US); Qing Li, Saratoga, CA (US); Cheng-Chih Hsieh, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/931,492

(22) Filed: Oct. 30, 2024

(65) Prior Publication Data

US 2025/0231580 A1 Jul. 17, 2025

Related U.S. Application Data

(60) Provisional application No. 63/620,021, filed on Jan. 11, 2024.

(51) Int. Cl.
*G06F 1/10* (2006.01)
*G09G 3/20* (2006.01)

(52) U.S. Cl.
CPC .................. *G06F 1/10* (2013.01); *G09G 3/20* (2013.01)

(58) Field of Classification Search
None
See application file for complete search history.

(56) References Cited

U.S. PATENT DOCUMENTS

| 8,681,077 B2 | 3/2014 | Kimura |
| 10,068,530 B2 | 9/2018 | Lee et al. |
| 11,100,900 B2 | 8/2021 | Park et al. |
| 11,233,113 B2 | 1/2022 | Yu et al. |

(Continued)

FOREIGN PATENT DOCUMENTS

| CN | 101937647 B | 9/2012 |
| CN | 102290027 B | 10/2013 |

(Continued)

*Primary Examiner* — Ifedayo B Iluyomade
(74) *Attorney, Agent, or Firm* — Treyz Law Group; Jason Tsai

(57) ABSTRACT

A display may include an array of pixels that receive row control signals from gate driver circuitry. The gate driver circuitry can include a chain of gate drivers configured to receive one or more clock signals. The gate driver circuitry can further include inverters configured to invert the one or more clock signals to generate inverted clock signals. The clock signals and the inverted clock signals can be conveyed to the chain of gate drivers. Falling edges of the clock signals and the inverted clock signals can be used to trigger assertions and deassertions of the row control signals. Operated in this way, the power consumption of the gate driver circuitry can be reduced.

21 Claims, 18 Drawing Sheets

(56) References Cited

U.S. PATENT DOCUMENTS

| | | | |
|---|---|---|---|
| 11,665,933 B2 | 5/2023 | Lin et al. | |
| 11,823,631 B2 | 11/2023 | Bae et al. | |
| 2014/0146026 A1* | 5/2014 | Yu | G09G 3/3677 345/208 |
| 2017/0031477 A1* | 2/2017 | Jamshidi Roudbari | G09G 3/3266 |

FOREIGN PATENT DOCUMENTS

| | | |
|---|---|---|
| CN | 103077689 B | 6/2015 |
| CN | 102881248 B | 12/2015 |

\* cited by examiner

DISPLAY WITH GATE DRIVER CIRCUITRY CONTROLLED BY TRUE AND COMPLEMENTARY CLOCK SIGNALS

This application claims the benefit of U.S. Provisional Patent Application No. 63/620,021, filed Jan. 11, 2024, which is hereby incorporated by reference herein in its entirety.

BACKGROUND

This relates generally to electronic devices with displays and, more particularly, to display driver circuitry for displays such as organic light-emitting diode (OLED) displays.

Electronic devices often include displays. For example, cellular telephones, tablets, wrist-watches, and portable computers typically include displays for presenting image content to users. OLED displays have an array of display pixels based on light-emitting diodes. In this type of display, gate driver circuitry is used to provide control signals to respective rows in the array of display pixels. It can be challenging to design the gate driver circuitry.

SUMMARY

An electronic device may include a display having an array of display pixels. The display pixels may be organic light-emitting diode display pixels. Each display pixel may include at least an organic light-emitting diode (OLED) that emits light and associated semiconducting oxide transistors.

An aspect of the disclosure provides a display that includes an array of pixels, a first gate driver circuit configured to generate a first gate output signal that is conveyed to one or more rows of pixels in the array, a second gate driver circuit configured to generate a second gate output signal that is conveyed to one or more rows of pixels in the array, a first clock signal line on which a first clock signal is provided, and a first inverter configured to receive the first clock signal from the first clock signal line. The display may further include a second clock signal line on which a second clock signal is provided and a second inverter configured to receive the second clock signal from the second clock signal line. The second gate driver circuit can have an input coupled to the first gate driver circuit. The first gate driver circuit can be configured to receive the first clock signal, and the second gate driver circuit can be configured to receive an inverted version of the first clock signal from the first inverter. The display can further include a third gate driver circuit configured to generate a third gate output signal and having an input coupled to the second gate driver circuit, where the third gate driver circuit is configured to receive the second clock signal, and a fourth gate driver circuit configured to generate a fourth gate output signal and having an input coupled to the third gate driver circuit, where the fourth gate driver is configured to receive an inverted version of the second clock signal from the second inverter. The display can further include a reset line coupled to one or more reset transistors in the first gate driver circuit and coupled to one or more reset transistors in the second gate driver circuit.

An aspect of the disclosure provides a method that includes displaying image content with an array of pixels, outputting a first gate output signal to one or more rows of pixels in the array with a first gate driver, outputting a second gate output signal to one or more rows of pixels in the array with a second gate driver, receiving a first clock signal with the first gate driver, and receiving the first clock signal and outputting an inverted version of the first clock signal with a first inverter. The method can further include receiving the inverted version of the first clock signal from the first inverter with the second gate driver. The method can further include outputting a third gate output signal to one or more rows of pixels in the array with a third gate driver, outputting a fourth gate output signal to one or more rows of pixels in the array with a fourth gate driver, receiving a second clock signal with the third gate driver, and receiving the second clock signal and outputting an inverted version of the second clock signal to the fourth gate driver with a second inverter. The method can further include triggering assertion of the first gate output signal with a falling clock edge of the first clock signal and triggering assertion of the second gate output signal with a falling clock edge of the inverted version of the first clock signal.

An aspect of the disclosure provides a display that includes an array of pixels and gate driver circuitry configured to receive only one clock signal. The gate driver circuitry includes: a first gate driver circuit configured to generate a first gate output signal that is conveyed to one or more rows of pixels in the array, where the first gate driver circuit is configured to receive the clock signal; an inverter configured to receive the clock signal and to generate an inverted clock signal; and a second gate driver circuit configured to generate a second gate output signal that is conveyed to one or more rows of pixels in the array, where the second gate driver circuit is configured to receive the inverted clock signal. The first gate output signal can be conveyed to a first group of four rows of pixels in the array, and the second gate output signal can be conveyed to a second group of four rows of pixels in the array. The display can further include a reset control line configured to convey a global reset signal simultaneously to the first and second gate driver circuits.

DETAILED DESCRIPTION

Figure 1:
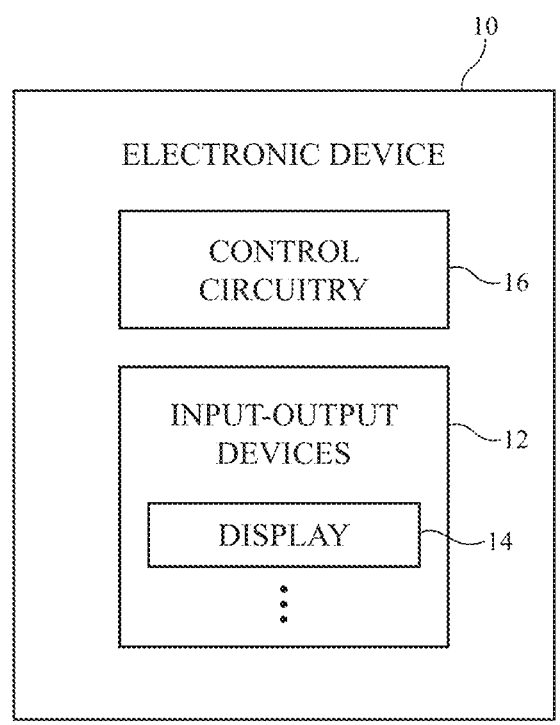
FIG. 1 is a diagram of an illustrative electronic device having a display in accordance with some embodiments.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, application processors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14 using an array of pixels in display 14. Device 10 may be a tablet computer, laptop computer, a desktop computer, a display, a cellular telephone, a media player, a wristwatch device or other wearable electronic equipment, or other suitable electronic device.

Display 14 may be an organic light-emitting diode display or may be a display based on other types of display technology. Configurations in which display 14 is an organic light-emitting diode (OLED) display are sometimes described herein as an example. This is, however, merely illustrative. Any suitable type of display may be used in device 10, if desired.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
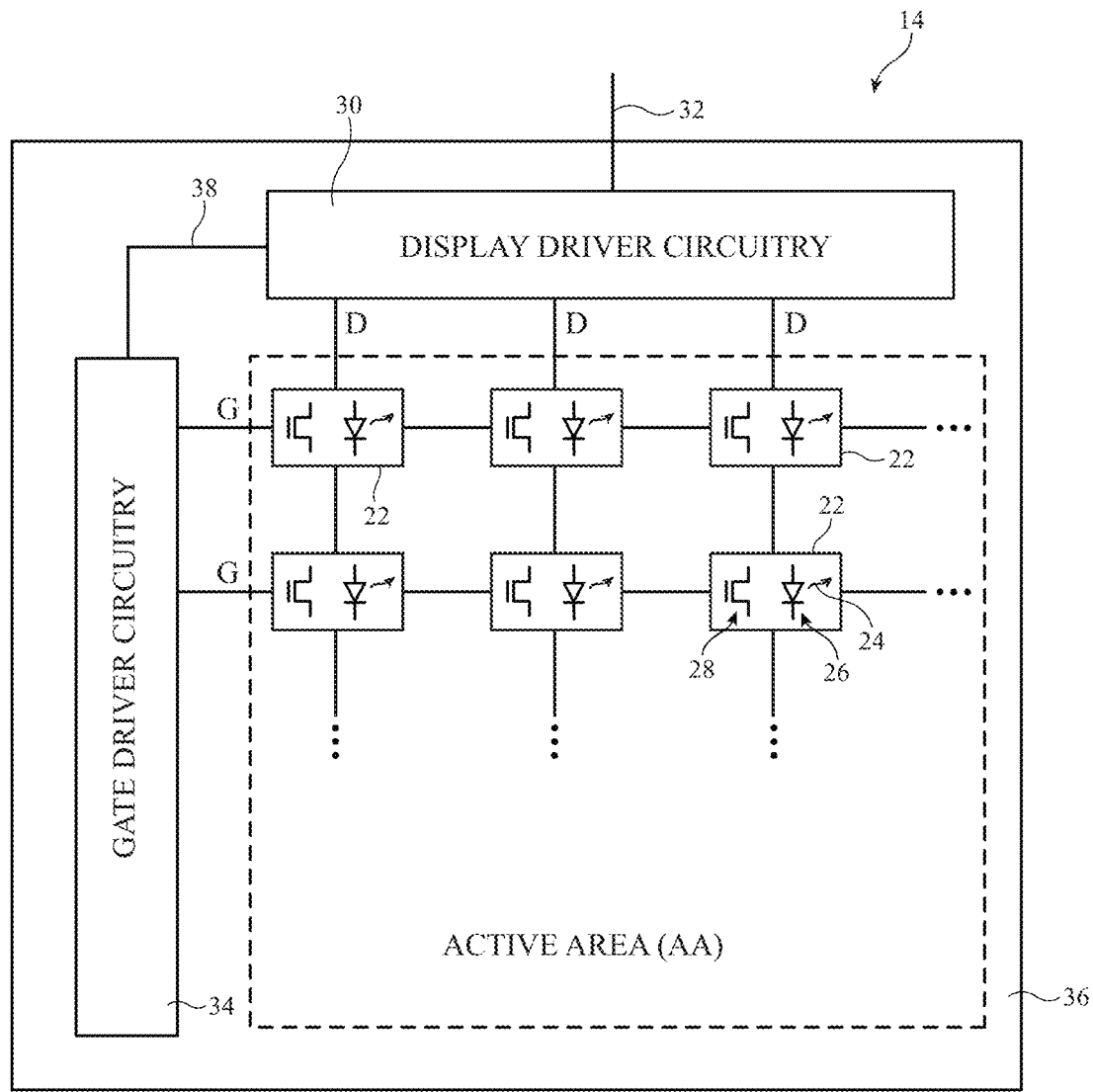
FIG. 2 is a diagram of an illustrative display having an array of organic light-emitting diode display pixels in accordance with some embodiments.

A top plan view of a portion of display 14 is shown in FIG. 2. As shown in FIG. 2, display 14 may have an array of pixels 22 formed on substrate 36. Substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may have a light-emitting diode 26 that emits light 24 under the control of a pixel control circuit formed from thin-film transistor circuitry such as thin-film transistors 28 and thin-film capacitors). Thin-film transistors 28 may be polysilicon thin-film transistors, semiconducting-oxide thin-film transistors such as indium zinc gallium oxide transistors, or thin-film transistors formed from other semiconductors. Pixels 22 may contain light-emitting diodes of different colors (e.g., red, green, and blue) to provide display 14 with the ability to display color images. The array of pixels 22 configured to display image content on display 14 may be formed in an active area AA of the display.

Display driver circuitry may be used to control the operation of pixels 22. The display driver circuitry may be formed from integrated circuits, thin-film transistor circuits, or other suitable electronic circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D (e.g., data lines that run down the columns of pixels 22) while issuing clock signals and other control signals to supporting display driver circuitry such as gate driver circuitry 34 over path 38.

If desired, circuitry 30 may also supply clock signals and/or other control signals to gate driver circuitry 34 on an opposing edge of display 14 (e.g., the gate driver circuitry may be formed on more than one side of the display pixel array). Display driver circuitry 30 and gate driver circuitry 34 can be formed in a border area disposed along one or more peripheral edges of the active area AA.

Gate driver circuitry 34 (sometimes referred to as horizontal line control/driver circuitry or row control/driver circuitry) may be implemented as part of an integrated circuit and/or may be implemented using thin-film transistor circuitry. Horizontal/row control lines G in display 14 may carry gate line signals (scan line signals), emission enable control signals, and other horizontal control signals for controlling the pixels of one or more rows of pixels in the active area. There may be any suitable number of horizontal control signals per row of pixels 22 (e.g., one or more row control lines, two or more row control lines, three or more row control lines, four or more row control lines, five or more row control lines, etc.).

Conventional gate driver circuits are typically controlled based on only a single clock edge of one or more clock signals output from the display driver circuitry. For instance, a chain of gate drivers might be triggered by only the falling clock edges of a given clock signal. In such configurations, each gate driver in the chain will output a corresponding gate pulse signal having a rising pulse edge that is triggered by a falling clock edge in the given clock signal and having a falling pulse edge that is triggered by another falling clock edge in the given clock signal. If care is not taken, triggering transitions in the gate pulse (output) signal using only falling clock edges in this way can consume a substantial amount of power.

Figure 3:
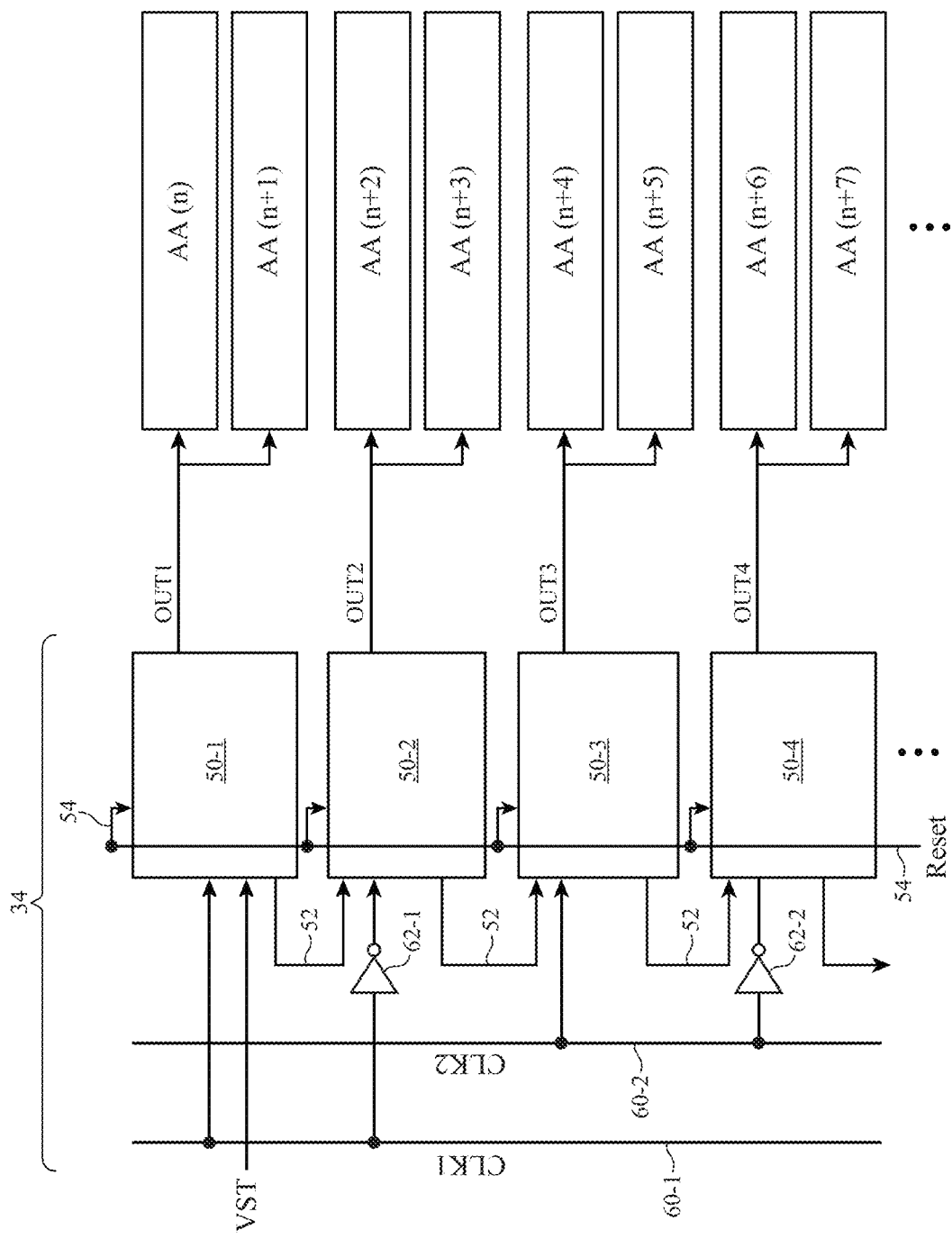
FIG. 3 is a diagram of an illustrative chain of gate driver circuits controlled by two clock signals and inverted versions of the two clock signals in accordance with some embodiments.

In accordance with an embodiment, gate driver circuitry 34 may be triggered by both rising and falling edges of one or more clock signals received from display driver circuitry 30. Gate driver circuitry 34 that is sensitive to both rising and falling clock edges can help reduce the required clock frequency by half, which is technically advantageous and beneficial to reduce the overall power consumption of display 14 by around 50%. FIG. 3 is a diagram of illustrative gate driver circuitry 34 that is controlled by two clock signals CLK1 and CLK2 and inverted versions of the two clock signals. As shown in FIG. 3, gate driver circuitry 34 may include a chain of gate driver circuits 50, which include at least a first gate driver circuit 50-1, a second gate driver circuit 50-2, a third gate driver circuit 50-3, a fourth gate driver circuit 50-4, and so on all connected in series.

Each gate driver circuit 50 may output a corresponding gate output signal that is conveyed to one or more rows of display pixels in the array. First gate driver 50-1 may be configured to output a first gate output signal OUT1. Second gate driver 50-2 may be configured to output a second gate output signal OUT2. Third gate driver 50-3 may be configured to output a third gate output signal OUT3. Fourth gate driver 50-4 may be configured to output a fourth gate output signal OUT4. Each output signal (e.g., a scan control signal, an emission control signal, or other row control signal) may control two rows of pixels in the active display area. For example, first gate output signal OUT1 may be used to control a first pixel row labeled AA(n) and a second pixel row labeled AA(n+1), second gate output signal OUT2 may be used to control a third pixel row labeled AA(n+2) and a fourth pixel row labeled AA(n+3), third gate output signal OUT3 may be used to control a fifth pixel row labeled AA(n+4) and a sixth pixel row labeled AA(n+5), fourth gate output signal OUT4 may be used to control a seventh pixel row labeled AA(n+6) and an eighth pixel row labeled AA(n+7), and so on. The terminology "n" may refer to a particular row in the display pixel array, where "n+1" refers to a succeeding row below row n, where "n+2" refers to two rows below row n, and so on.

As described above, the gate driver circuits 50 may be coupled in series, as shown by series connection paths 52 in FIG. 3. In some configurations, a carry signal may be conveyed from one gate driver circuit to the next via path 52. In some configurations, a gate output signal may be conveyed from one gate driver circuit to the next via path 52 (e.g., gate output signal OUT1 may be conveyed from gate driver 50-1 to gate driver 50-2 via a first series connection path 52, gate output signal OUT2 may be conveyed from gate driver 50-2 to gate driver 50-3 via a second series connection path 52, etc.). In some configurations, carry and gate output signals may be conveyed from one gate driver circuit to the next via path 52. Furthermore, each gate driver circuit 50 in the chain can be configured to receive a reset signal via a reset control line 54. The reset signal may represent a global reset signal. The reset signal may be asserted to reset one or more nodes within each gate driver circuit 50 to ensure a proper power on and power off sequence (e.g., when powering on display 14 and when powering off display 14).

The first gate driver circuit 50-1 in the chain of gate drivers within circuitry 34 may receive a gate start pulse signal VST. The gate start pulse signal VST may trigger the generation and propagation of gate output signals down the chain of gate driver circuits. In the example of FIG. 3, gate driver circuitry 34 may receive a first clock signal CLK1 and a second clock signal CLK2 from display driver circuitry 30 (see, e.g., FIG. 2 via control path 38). The first clock signal CLK1 may be provided on a first clock signal line 60-1, whereas the second clock signal CLK2 may be provided on a second clock signal line 60-2. Clock signal lines 60-1 and 60-2 may be column lines extending in a direction parallel to the chain of gate driver circuits (as an example).

In particular, the first gate driver 50-1 may be configured to receive clock signal CLK1 directly from clock signal line 60-1. The second gate driver 50-2 may be configured to receive an inverted version of clock signal CLK1 via a first inverter 62-1. The third gate driver 50-3 may be configured to receive clock signal CLK2 directly from clock signal line 60-2. The fourth gate driver 50-4 may be configured to receive an inverted version of clock signal CLK2 via a second inverter 62-2. Clock signal CLK1 and its corresponding inverted version at the output of inverter 62-1 may be referred to respectively as "true" and "complementary" first clock signals. Clock signal CLK2 and its corresponding inverted version at the output of inverter 62-2 may be referred to respectively as "true" and "complementary" second clock signals. Although only four gate driver circuits are shown in FIG. 3, gate driver circuitry 34 may include tens, hundreds, or thousands of gate driver circuits connected in a chain. The driving scheme for the other gate driver circuits in circuitry 34 can be repeated for the remaining rows.

Figure 4A:
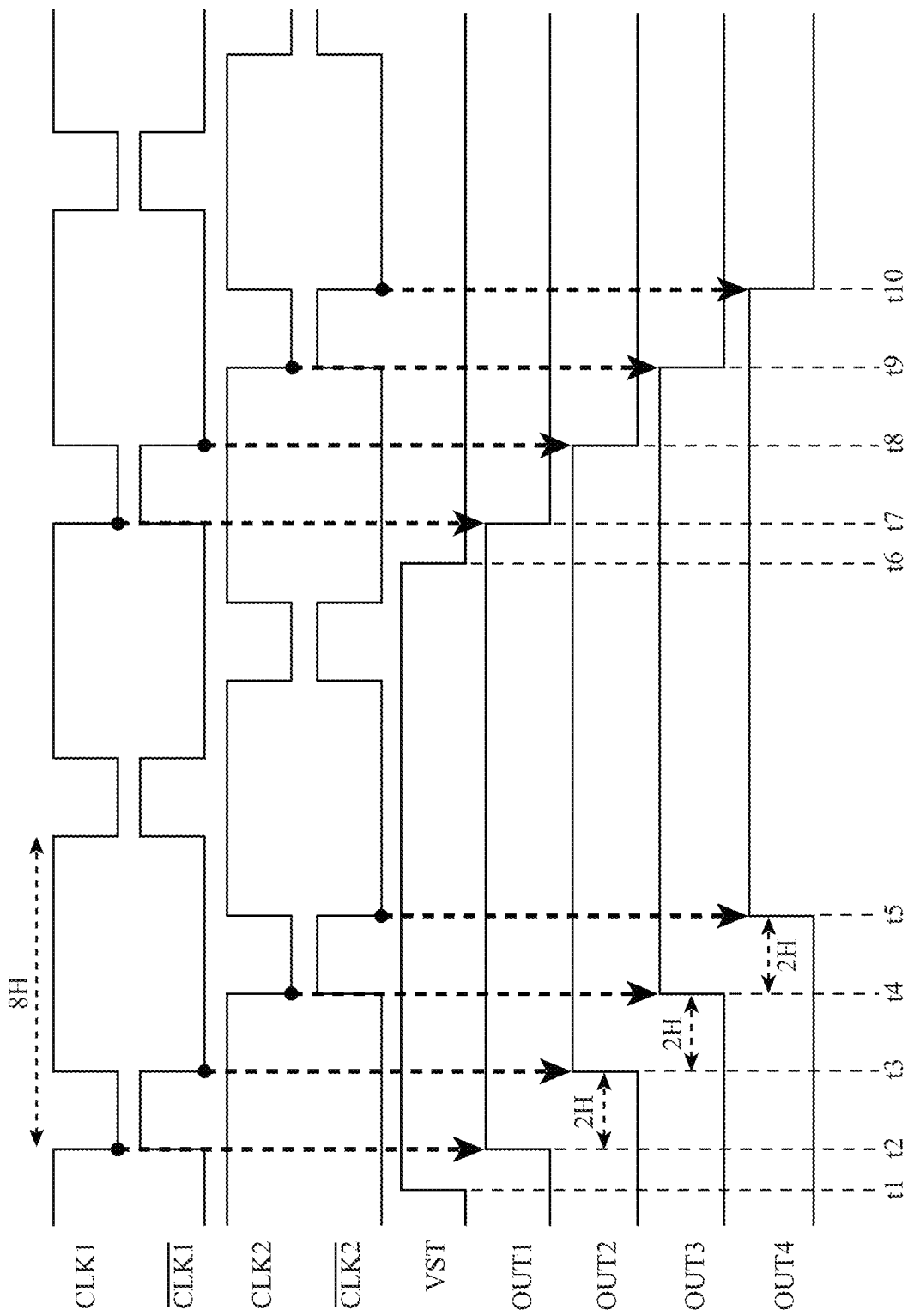
FIGS. 4A and 4B are timing diagrams showing different ways for operating the chain of gate driver circuits of the type shown in FIG. 3 in accordance with some embodiments.
Figure 4B:
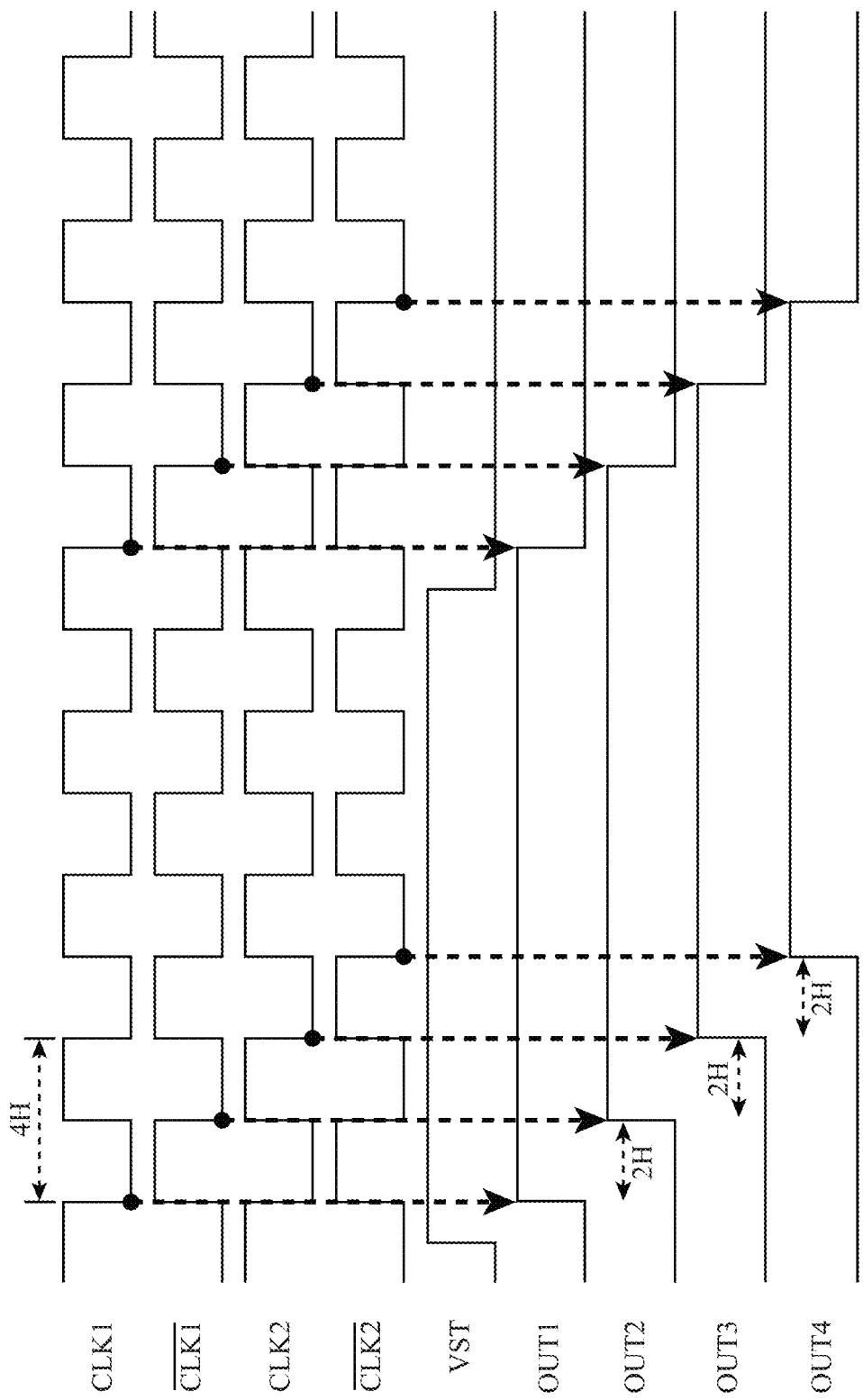

FIGS. 4A and 4B are timing diagrams showing different ways for operating the chain of gate driver circuits of the type described in connection with FIG. 3. FIG. 4A illustrates a driving scheme where the clock signals CLK1 and CLK2 have a clock period of 8*H, where H represents a single row time. A "row time" may refer to and be defined herein as the minimum time period of a data loading operation for loading a data signal into a row of pixels. Clock signal /CLK1 represents the inverted (complementary) version of true clock signal CLK1. Clock signal /CLK2 represents the inverted (complementary) version of true clock signal CLK2. Gate start pulse VST may be pulsed high for two clock periods or 16H, from time t1 to t6 (as an example).

As shown in FIG. 4A, the first gate output signal OUT1 may have a rising pulse edge that is trigged by a falling clock edge of CLK1 (at time t2). The second gate output signal OUT2 may have a rising pulse edge that is trigged by a falling clock edge of /CLK1 (at time t3). The third gate output signal OUT3 may have a rising pulse edge that is trigged by a falling clock edge of CLK2 (at time t4). The fourth gate output signal OUT4 may have a rising pulse edge that is trigged by a falling clock edge of /CLK2 (at time t5). In other words, the falling edges of the clock signals can be used to trigger assertions of the gate output signals. This is illustrative. In other embodiments, the rising edges of the true and complementary clock signals can be used to trigger assertions of the gate output signals. Successive gate output signals may be delayed with respect to one another by 2*H since each gate driver circuit 50 in FIG. 3 needs to drive a pair of pixel rows.

The duration of each gate output signal pulse may be proportional or equal to the duration of the gate start pulse VST. The first gate output signal OUT1 may have a falling pulse edge that is trigged by a falling clock edge of CLK1 (at time t7). The second gate output signal OUT2 may have a falling pulse edge that is trigged by a falling clock edge of /CLK1 (at time t8). The third gate output signal OUT3 may have a falling pulse edge that is trigged by a falling clock edge of CLK2 (at time t9). The fourth gate output signal OUT4 may have a falling pulse edge that is trigged by a falling clock edge of /CLK2 (at time t10). In other words, the falling edges of the clock signals can be used to trigger deassertion of the gate output signals. This is illustrative. In other embodiments, the rising edges of the true and complementary clock signals can be used to trigger deassertions of the gate output signals. The driving scheme can be similarly replicated for remaining pixels rows.

FIG. 4B illustrates a driving scheme where the clock signals CLK1 and CLK2 have a clock period of 4*H, where H represents a single row time. Gate start pulse VST may be pulsed high for four clock periods or 16H (as an example). Compared to the timing of FIG. 4A, the clock signals CLK1, /CLK1, CLK2, and /CLK2 of FIG. 4B exhibit twice the frequency, but the timing of the gate output signals OUT1-OUT4 remain the same. The timing of FIG. 4B can thus provide a more granular control while keeping the same 2H propagation between successive gate output signals. Compared to the timing of FIG. 4B, the timing of FIG. 4A can thus provide the same gate output waveforms with 50% lower power consumption.

Figure 5:
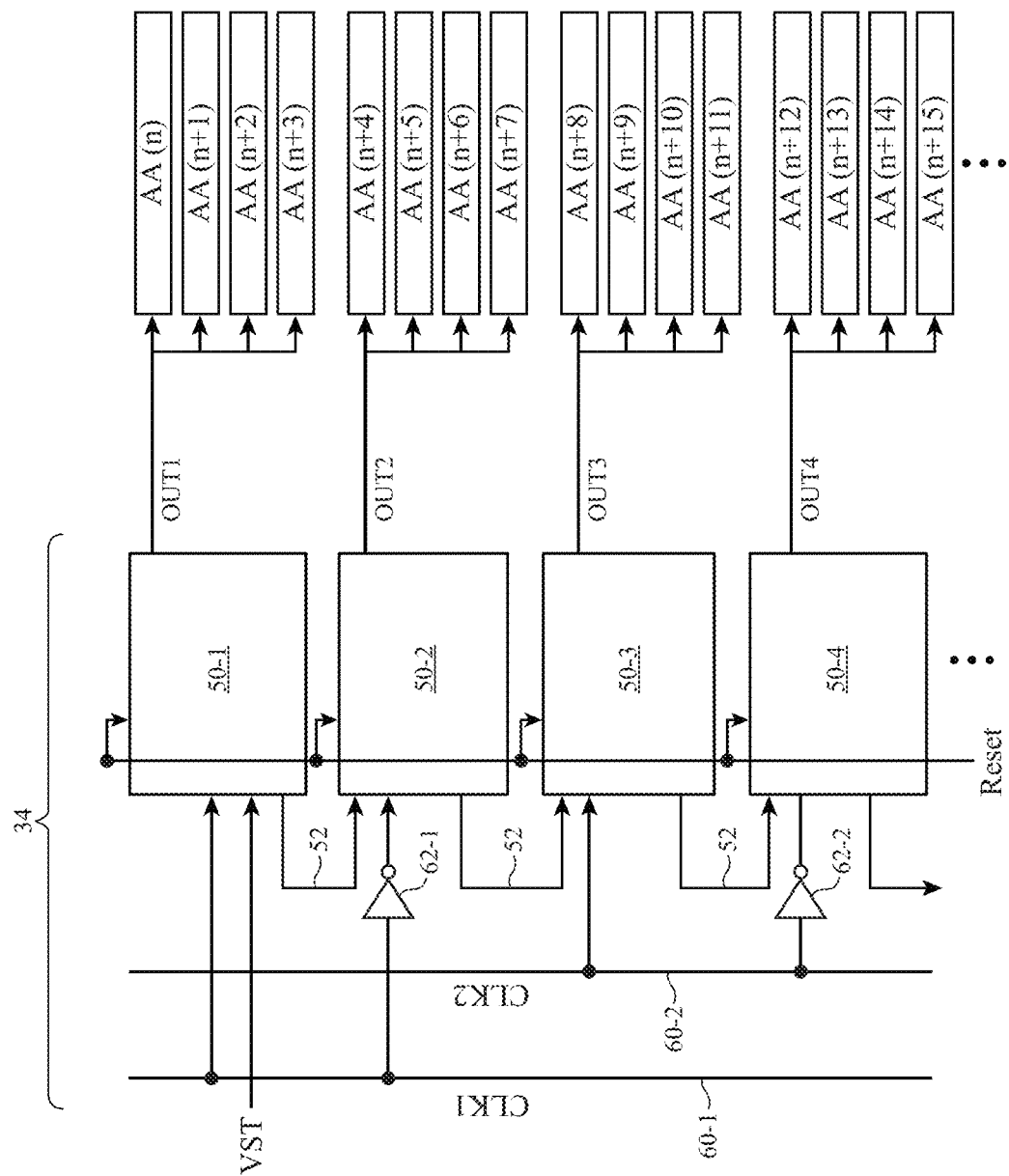
FIG. 5 is a diagram of an illustrative chain of gate driver circuits each of which is configured to drive four rows of display pixels in accordance with some embodiments.

The embodiment of FIG. 3 in which each gate driver circuit 50 is coupled to a pair of pixel rows is illustrative. FIG. 5 illustrates another embodiment of gate driver circuitry 34 in which each gate driver circuit 50 is coupled to four pixel rows. As shown in FIG. 5, gate driver circuitry 34 may include a chain of gate driver circuits 50, which include at least a first gate driver circuit 50-1, a second gate driver circuit 50-2, a third gate driver circuit 50-3, a fourth gate driver circuit 50-4, and so on all connected in series. Each gate driver circuit 50 may output a corresponding gate output signal. First gate driver 50-1 may be configured to output a first gate output signal OUT1. Second gate driver 50-2 may be configured to output a second gate output signal OUT2. Third gate driver 50-3 may be configured to output a third gate output signal OUT3. Fourth gate driver 50-4 may be configured to output a fourth gate output signal OUT4. Each output signal (e.g., a scan control signal, an emission control signal, or other row control signal) may control a group of four rows of pixels in the active display area. For example, first gate output signal OUT1 may be used to control four corresponding pixel rows labeled AA(n), AA(n+1), AA(n+2), and AA(n+3), second gate output signal OUT2 may be used to control four corresponding pixel rows labeled AA(n+4), AA(n+5), AA(n+6), and AA(n+7), third gate output signal OUT3 may be used to control four corresponding pixel rows labeled AA(n+8), AA(n+9), AA(n+10), and AA(n+11), fourth gate output signal OUT4 may be used to control four corresponding pixel rows labeled AA(n+12), AA(n+13), AA(n+14), and AA(n+15), and so on.

As described above, the gate driver circuits 50 may be coupled in series, as shown by series connection paths 52 in FIG. 5. In some configurations, a carry signal may be conveyed from one gate driver circuit to the next via path 52. In some configurations, a gate output signal may be conveyed from one gate driver circuit to the next via path 52 (e.g., gate output signal OUT1 may be conveyed from gate driver 50-1 to gate driver 50-2 via a first series connection path 52, gate output signal OUT2 may be conveyed from gate driver 50-2 to gate driver 50-3 via a second series connection path 52, etc.). In some configurations, carry and gate output signals may be conveyed from one gate driver circuit to the next via path 52. Furthermore, each gate driver circuit 50 in the chain can be configured to receive a reset signal via a reset control line 54. The reset signal may represent a global reset signal. The reset signal may be asserted to reset one or more nodes within each gate driver circuit 50 to ensure a proper power on and power off sequence (e.g., when powering on display 14 and when powering off display 14).

The first gate driver circuit 50-1 in the chain of gate drivers within circuitry 34 may receive a gate start pulse signal VST. The gate start pulse signal VST may trigger the generation and propagation of gate output signals down the chain of gate driver circuits. In the example of FIG. 5, gate driver circuitry 34 may receive a first clock signal CLK1 and a second clock signal CLK2 from display driver circuitry 30 (see, e.g., FIG. 2 via control path 38). The first clock signal CLK1 may be provided on a first clock signal line 60-1, whereas the second clock signal CLK2 may be provided on a second clock signal line 60-2. Clock signal lines 60-1 and 60-2 may be column lines extending in a direction parallel to the chain of gate driver circuits (as an example).

In particular, the first gate driver 50-1 may be configured to receive clock signal CLK1 directly from clock signal line 60-1. The second gate driver 50-2 may be configured to receive an inverted version of clock signal CLK1 via a first inverter 62-1. The third gate driver 50-3 may be configured to receive clock signal CLK2 directly from clock signal line 60-2. The fourth gate driver 50-4 may be configured to receive an inverted version of clock signal CLK2 via a second inverter 62-2. Although only four gate driver circuits are shown in FIG. 5, gate driver circuitry 34 may include tens, hundreds, or thousands of gate driver circuits connected in a chain. The driving scheme for the other gate driver circuits in circuitry 34 can be repeated for the remaining rows.

Figure 6A:
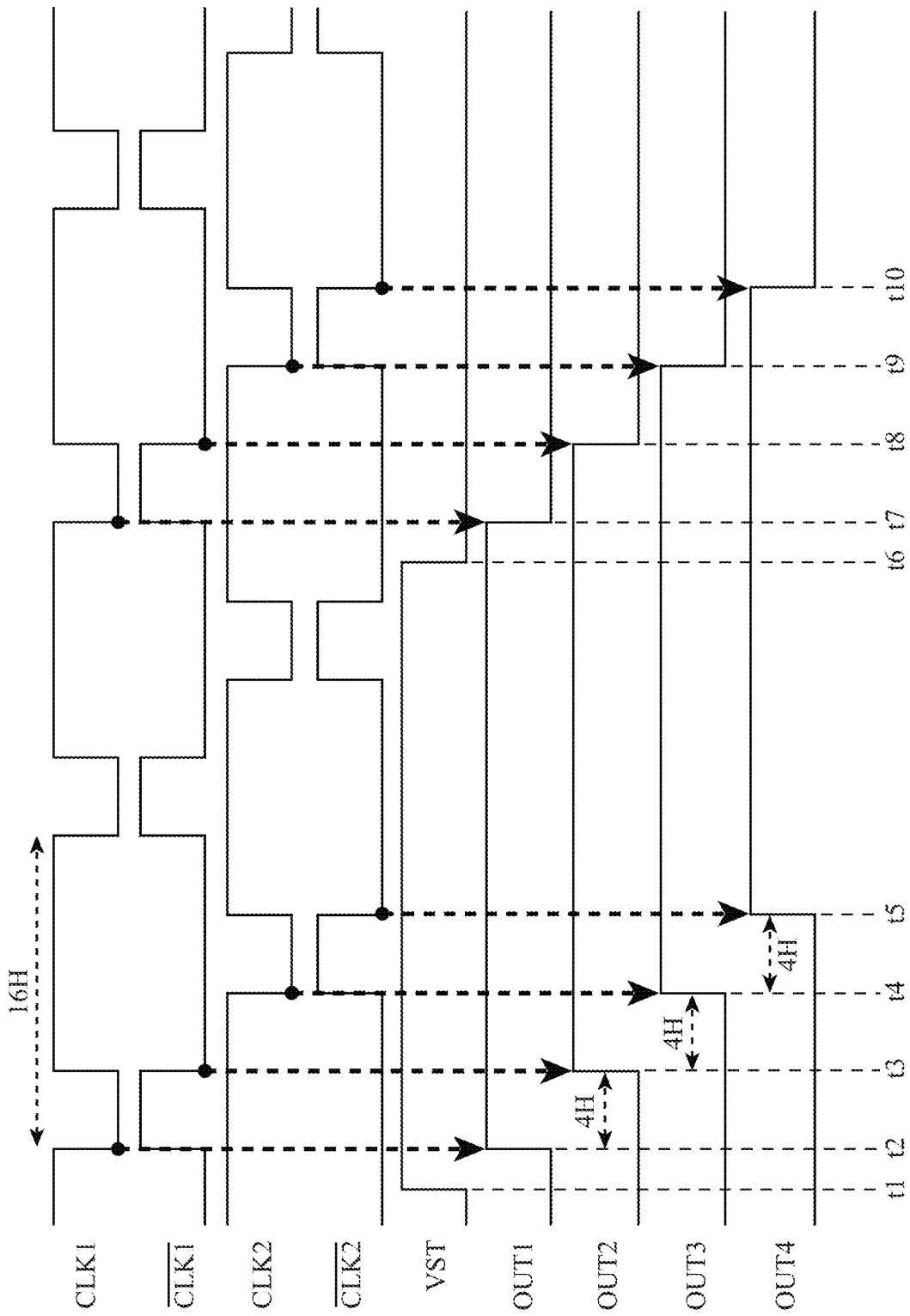
FIGS. 6A and 6B are timing diagrams showing different ways for operating the chain of gate driver circuits of the type shown in FIG. 5 in accordance with some embodiments.
Figure 6B:
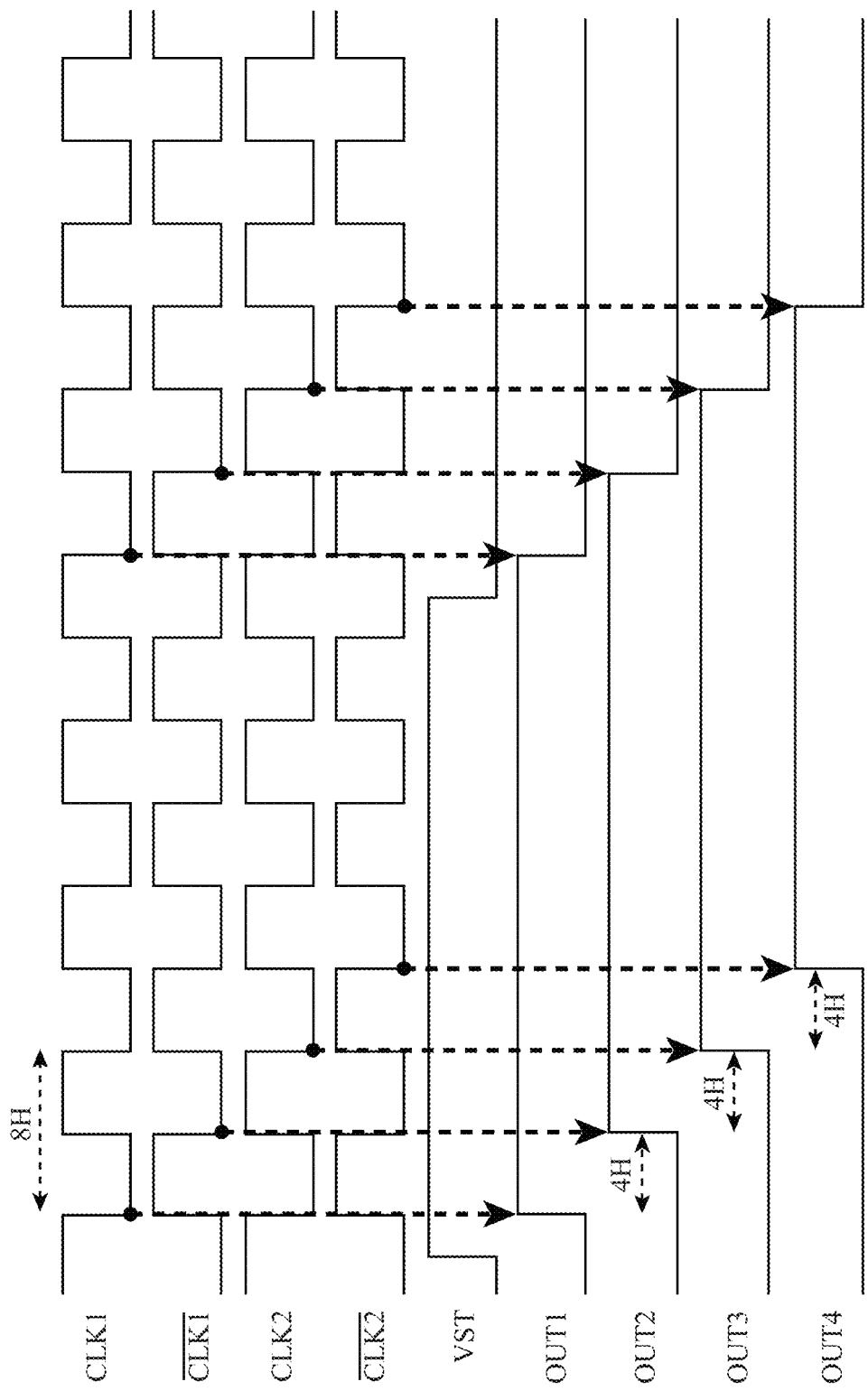

FIGS. 6A and 6B are timing diagrams showing different ways for operating the chain of gate driver circuits of the type described in connection with FIG. 5. FIG. 6A illustrates a driving scheme where the clock signals CLK1 and CLK2 have a clock period of 16*H, where H represents a single row time. Gate start pulse VST may be pulsed high for two clock periods or 32H, from time t1 to t6 (as an example). As shown in FIG. 6A, the first gate output signal OUT1 may have a rising pulse edge that is trigged by a falling clock edge of CLK1 (at time t2). The second gate output signal OUT2 may have a rising pulse edge that is trigged by a falling clock edge of /CLK1 (at time t3). The third gate output signal OUT3 may have a rising pulse edge that is trigged by a falling clock edge of CLK2 (at time t4). The fourth gate output signal OUT4 may have a rising pulse edge that is trigged by a falling clock edge of /CLK2 (at time t5). Successive gate output signals may be delayed with respect to one another by 4*H since each gate driver circuit 50 in FIG. 5 needs to drive a group of four pixel rows.

The duration of each gate output signal pulse may be proportional or equal to the duration of the gate start pulse VST. The first gate output signal OUT1 may have a falling pulse edge that is trigged by a falling clock edge of CLK1 (at time t7). The second gate output signal OUT2 may have a falling pulse edge that is trigged by a falling clock edge of /CLK1 (at time t8). The third gate output signal OUT3 may have a falling pulse edge that is trigged by a falling clock edge of CLK2 (at time t9). The fourth gate output signal OUT4 may have a falling pulse edge that is trigged by a falling clock edge of /CLK2 (at time t10). The driving scheme can be similarly replicated for remaining pixels rows.

FIG. 6B illustrates a driving scheme where the clock signals CLK1 and CLK2 have a clock period of 8*H, where H represents a single row time. Gate start pulse VST may be pulsed high for eight clock periods or 32H (as an example). Compared to the timing of FIG. 6A, the clock signals CLK1, /CLK1, CLK2, and /CLK2 of FIG. 6B exhibit twice the frequency, but the timing of the gate output signals OUT1-OUT4 remain the same. The timing of FIG. 6B can thus provide a more granular control while keeping the same 4H propagation between successive gate output signals. Compared to the timing of FIG. 6B, the timing of FIG. 6A can thus provide the same gate output waveforms with 50% lower power consumption.

Figure 7:
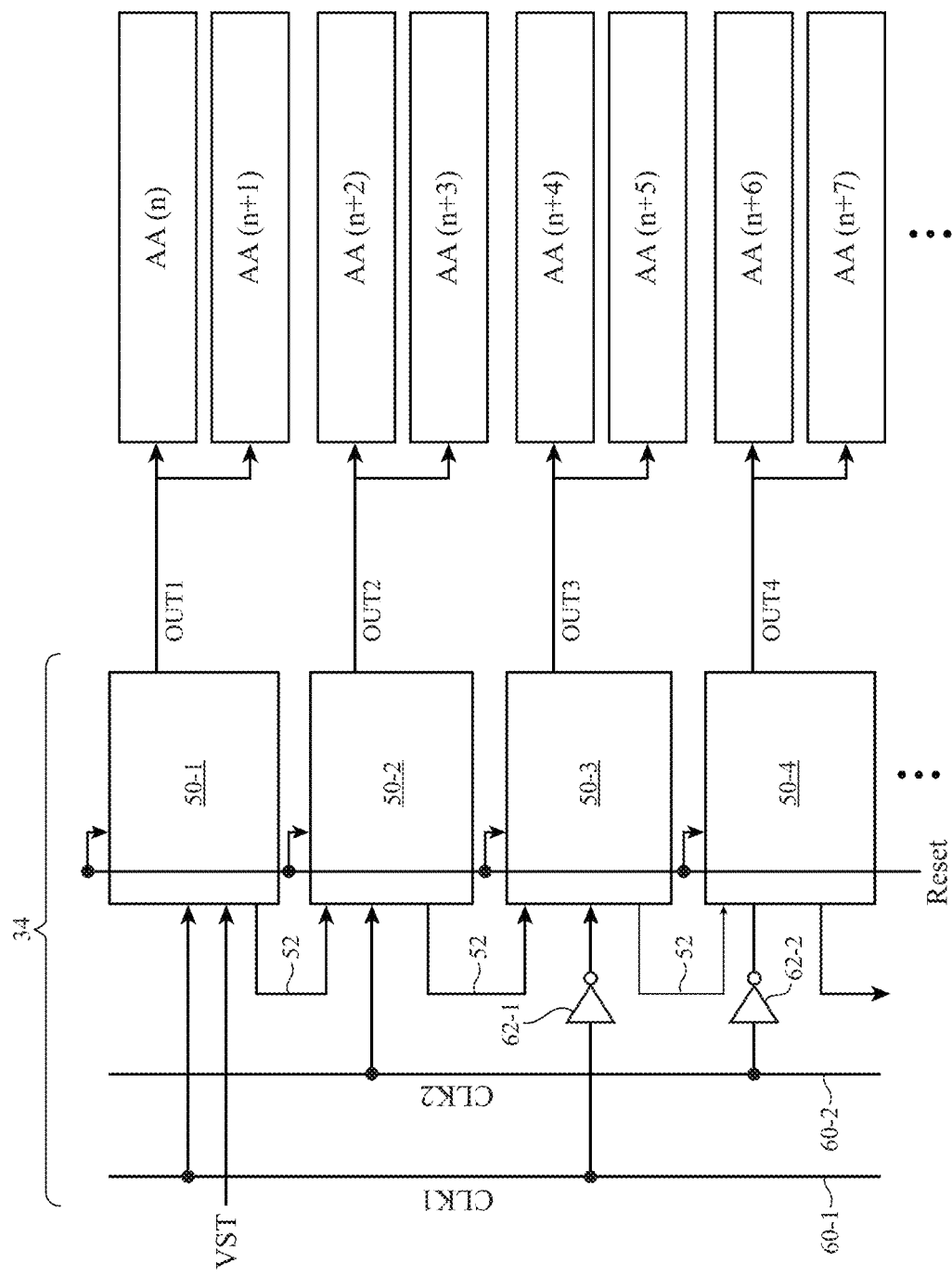
FIG. 7 is a diagram of an illustrative chain of gate driver circuits controlled by two clock signals and inverted versions of the two clock signals in accordance with some embodiments.

FIG. 7 illustrates another embodiment of gate driver circuitry 34 in which each gate driver circuit 50 is coupled to a pair of pixel rows. As shown in FIG. 7, gate driver circuitry 34 may include a chain of gate driver circuits 50, which include at least a first gate driver circuit 50-1 configured to generate OUT1, a second gate driver circuit 50-2 configured to generate OUT2, a third gate driver circuit 50-3 configured to generate OUT3, a fourth gate driver circuit 50-4 configured to generate OUT3, and so on all connected in series. Each output signal (e.g., a scan control signal, an emission control signal, or other row control signal) may control two rows of pixels in the active display area.

As described above, the gate driver circuits 50 may be coupled in series, as shown by series connection paths 52 in FIG. 5. In some configurations, a carry signal and/or a gate output signal may be conveyed from one gate driver circuit to the next via path 52. Furthermore, each gate driver circuit 50 in the chain can be configured to receive a reset signal via a reset control line 54. The reset signal may represent a global reset signal. The reset signal may be asserted to reset one or more nodes within each gate driver circuit 50 to ensure a proper power on and power off sequence (e.g., when powering on display 14 and when powering off display 14).

The first gate driver circuit 50-1 in the chain of gate drivers within circuitry 34 may receive a gate start pulse signal VST. The gate start pulse signal VST may trigger the generation and propagation of gate output signals down the chain of gate driver circuits. In the example of FIG. 7, gate driver circuitry 34 may receive a first clock signal CLK1 and a second clock signal CLK2 from display driver circuitry 30 (see, e.g., FIG. 2 via control path 38). The first clock signal CLK1 may be provided on a first clock signal line 60-1, whereas the second clock signal CLK2 may be provided on a second clock signal line 60-2. Clock signal lines 60-1 and 60-2 may be column lines extending in a direction parallel to the chain of gate driver circuits (as an example).

In particular, the first gate driver 50-1 may be configured to receive clock signal CLK1 directly from clock signal line 60-1. The second gate driver 50-2 may be configured to receive clock signal CLK2 directly from clock signal line 60-2. The third gate driver 50-3 may be configured to receive an inverted version of clock signal CLK1 via a first inverter 62-1. The fourth gate driver 50-4 may be configured to receive an inverted version of clock signal CLK2 via a second inverter 62-2. Although only four gate driver circuits are shown in FIG. 7, gate driver circuitry 34 may include tens, hundreds, or thousands of gate driver circuits connected in a chain. The driving scheme for the other gate driver circuits in circuitry 34 can be repeated for the remaining rows.

Figure 8:
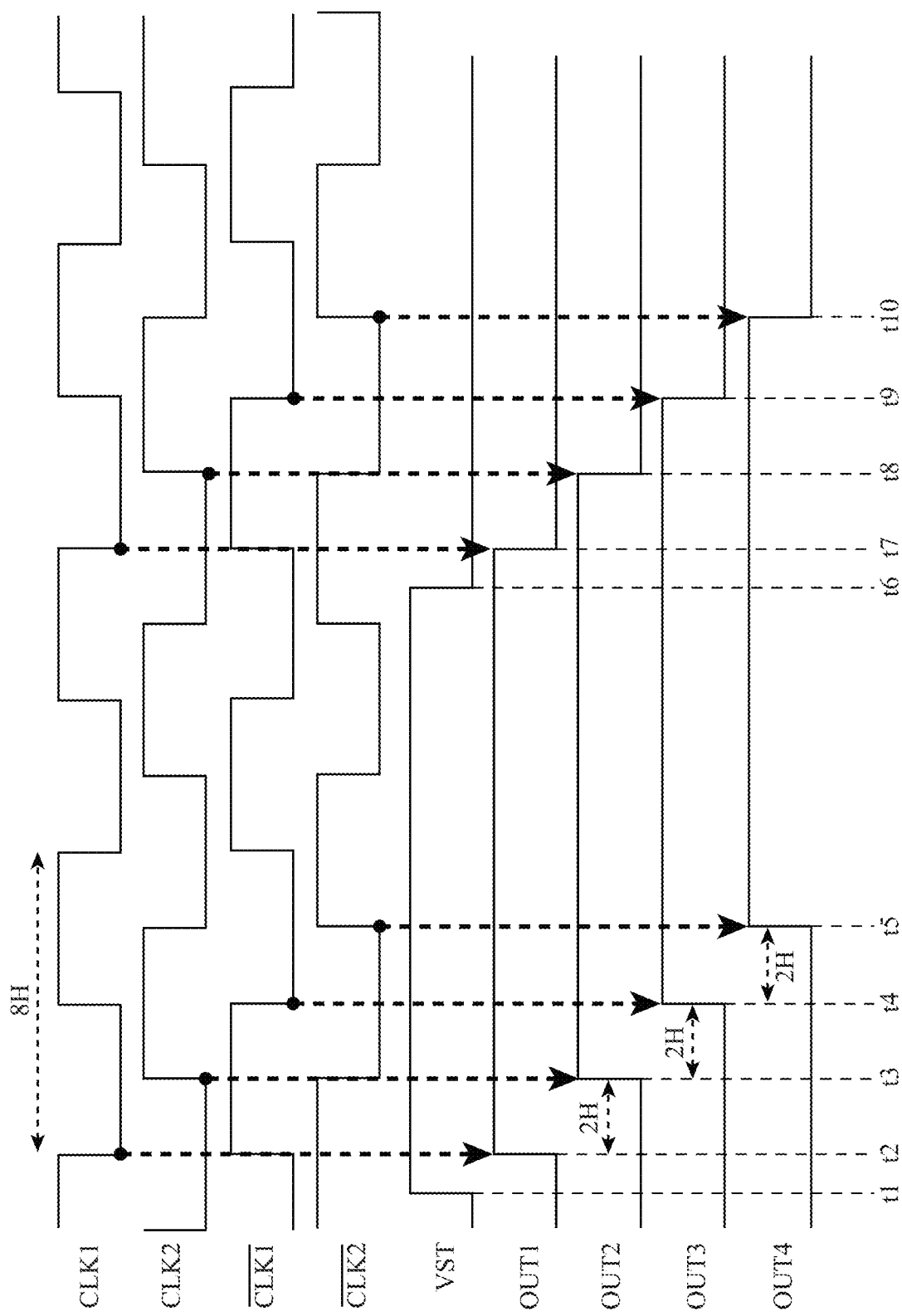
FIG. 8 is a timing diagram showing illustrative waveforms involved in operating the chain of gate driver circuits of the type shown in FIG. 7 in accordance with some embodiments.

FIG. 8 is a timing diagram showing illustrative waveforms involved in operating the chain of gate driver circuits of the type described in connection with FIG. 7. FIG. 8 illustrates a driving scheme where the clock signals CLK1 and CLK2 have a clock period of 8*H, where H represents a single row time. Gate start pulse VST may be pulsed high for two clock periods or 16H, from time t1 to t6 (as an example). As shown in FIG. 8, the first gate output signal OUT1 may have a rising pulse edge that is trigged by a falling clock edge of CLK1 (at time t2). The second gate output signal OUT2 may have a rising pulse edge that is trigged by a rising clock edge of CLK2 (at time t3). The third gate output signal OUT3 may have a rising pulse edge that is trigged by a falling clock edge of /CLK1 (at time t4). The fourth gate output signal OUT4 may have a rising pulse edge that is trigged by a rising clock edge of /CLK2 (at time t5). Successive gate output signals may be delayed with respect to one another by 2*H since each gate driver circuit 50 in FIG. 7 needs to drive a pair of pixel rows.

The duration of each gate output signal pulse may be proportional or equal to the duration of the gate start pulse VST. The first gate output signal OUT1 may have a falling pulse edge that is trigged by a falling clock edge of CLK1 (at time t7). The second gate output signal OUT2 may have a falling pulse edge that is trigged by a rising clock edge of CLK2 (at time t8). The third gate output signal OUT3 may have a falling pulse edge that is trigged by a falling clock edge of /CLK1 (at time t9). The fourth gate output signal OUT4 may have a falling pulse edge that is trigged by a rising clock edge of /CLK2 (at time t10). The driving scheme can be similarly replicated for remaining pixels rows. Operating gate driver circuitry 34 in this way can help reduce power consumption.

Figure 9:
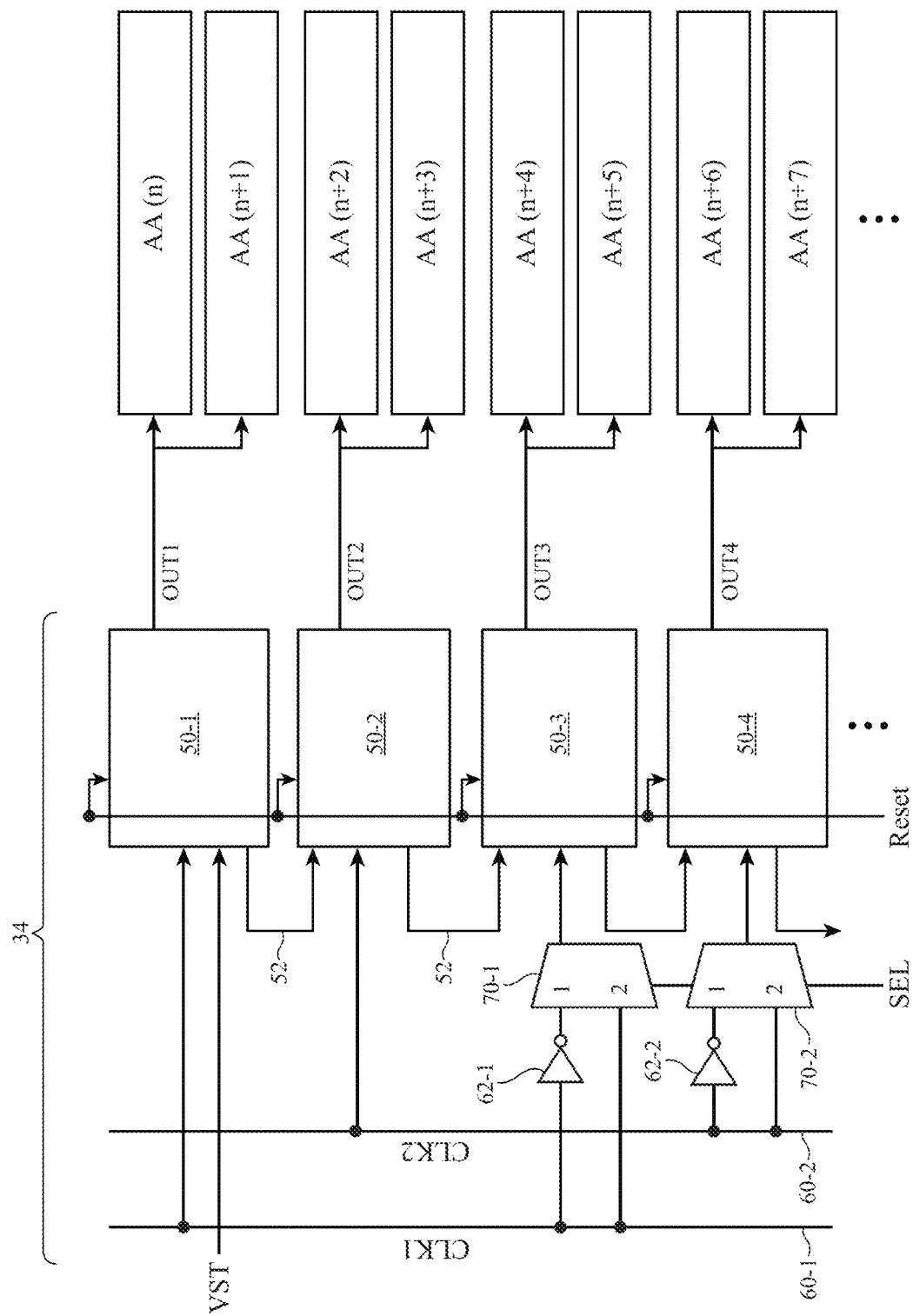
FIG. 9 is a diagram of an illustrative chain of gate driver circuits controlled by two clock signals and inverted versions of the two clock signals via multiplexing circuits in accordance with some embodiments.

FIG. 9 is a diagram of an illustrative chain of gate driver circuits controlled by two clock signals and inverted versions of the two clock signals via multiplexing circuits. As shown in FIG. 9, gate driver circuitry 34 may include a chain of gate driver circuits 50, which include at least a first gate driver circuit 50-1 configured to generate OUT1, a second gate driver circuit 50-2 configured to generate OUT2, a third gate driver circuit 50-3 configured to generate OUT3, a fourth gate driver circuit 50-4 configured to generate OUT3, and so on all connected in series. Each output signal (e.g., a scan control signal, an emission control signal, or other row control signal) may control two rows of pixels in the active display area.

As described above, the gate driver circuits 50 may be coupled in series, as shown by series connection paths 52 in FIG. 9. In some configurations, a carry signal and/or a gate output signal may be conveyed from one gate driver circuit to the next via path 52. Furthermore, each gate driver circuit 50 in the chain can be configured to receive a reset signal via a reset control line 54. The reset signal may represent a global reset signal. The reset signal may be asserted to reset one or more nodes within each gate driver circuit 50 to ensure a proper power on and power off sequence (e.g., when powering on display 14 and when powering off display 14).

The first gate driver circuit 50-1 in the chain of gate drivers within circuitry 34 may receive a gate start pulse signal VST. The gate start pulse signal VST may trigger the generation and propagation of gate output signals down the chain of gate driver circuits. In the example of FIG. 9, gate driver circuitry 34 may receive a first clock signal CLK1 and a second clock signal CLK2 from display driver circuitry 30 (see, e.g., FIG. 2 via control path 38). The first clock signal CLK1 may be provided on a first clock signal line 60-1, whereas the second clock signal CLK2 may be provided on a second clock signal line 60-2. Clock signal lines 60-1 and 60-2 may be column lines extending in a direction parallel to the chain of gate driver circuits (as an example). A first multiplexing circuit such as multiplexer 70-1 may have a first (1) input configured to receive /CLK1 from inverter 62-1, a second (2) input configured to receive CLK1 directly from clock signal line 60-1, a control input configured to receive select signal SEL, and an output coupled to gate driver circuit 50-3. A second multiplexing circuit such as multiplexer 70-2 may have a first (1) input configured to receive /CLK2 from inverter 62-2, a second (2) input configured to receive CLK2 directly from clock signal line 60-2, a control input configured to receive select signal SEL, and an output coupled to gate driver circuit 50-4. When the select signal SEL is driven to a first value, each multiplexer 70 may route the clock signal from their first (1) input to its output (e.g., multiplexers 70 are configured to output the complementary/inverted clock signals). When the select signal SEL is driven to a second value different than the first value, each multiplexer 70 may route the clock signal from their second (2) input to its output (e.g., multiplexers 70 are configured to output the true/non-inverted clock signals).

In particular, the first gate driver 50-1 may be configured to receive clock signal CLK1 directly from clock signal line 60-1. The second gate driver 50-2 may be configured to receive clock signal CLK2 directly from clock signal line 60-2. The third gate driver 50-3 may be configured to receive either /CLK1 or CLK1 via multiplexer 70-1 depending on the value of signal SEL. The fourth gate driver 50-4 may be configured to receive either /CLK2 or CLK2 via multiplexer 70-2 depending on the value of signal SEL. Although only four gate driver circuits are shown in FIG. 9, gate driver circuitry 34 may include tens, hundreds, or thousands of gate driver circuits connected in a chain. The driving scheme for the other gate driver circuits in circuitry 34 can be repeated for the remaining rows.

Figure 10A:
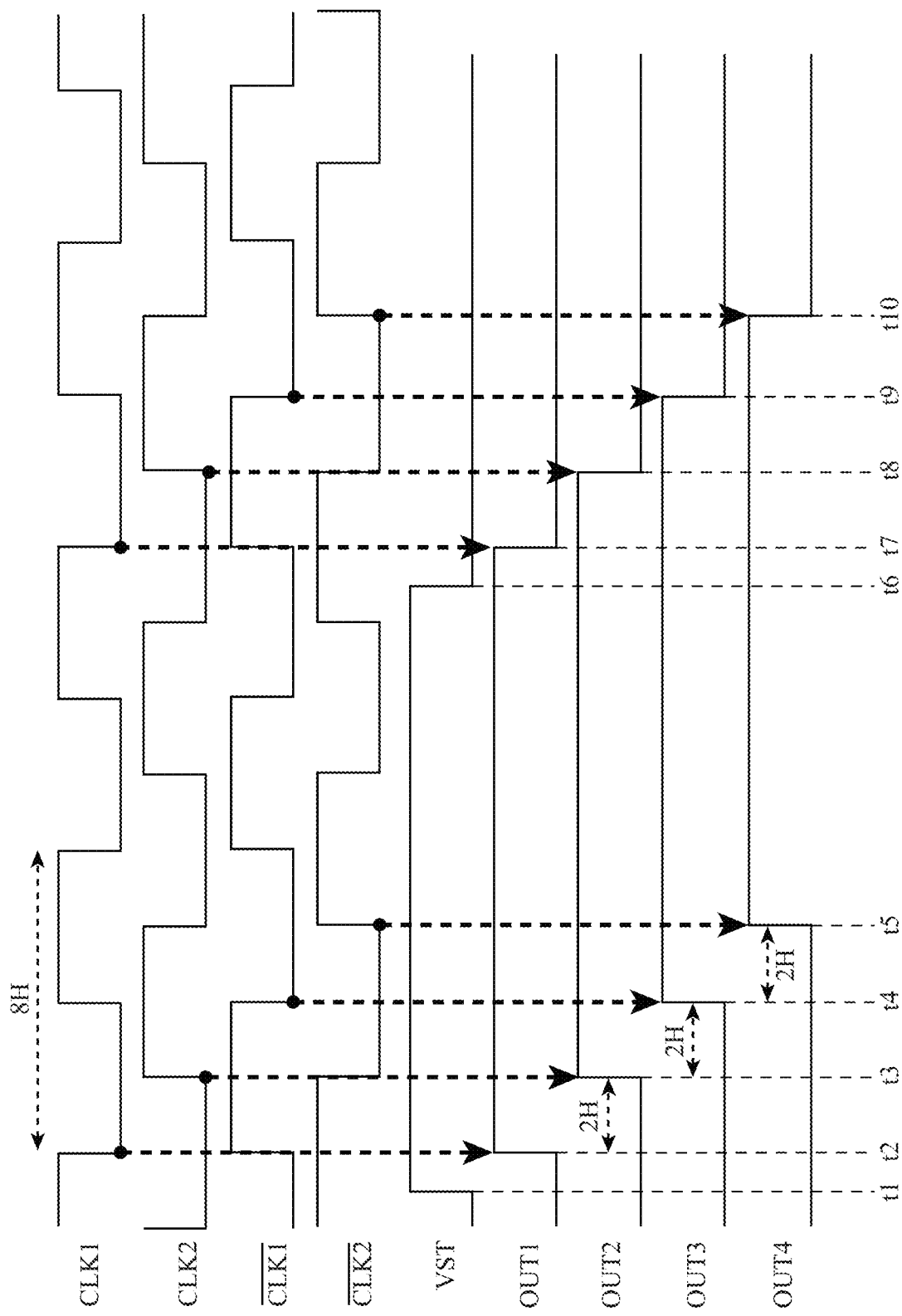
FIGS. 10A and 10B are timing diagrams showing different ways for operating the chain of gate driver circuits of the type shown in FIG. 9 in accordance with some embodiments.
Figure 10B:
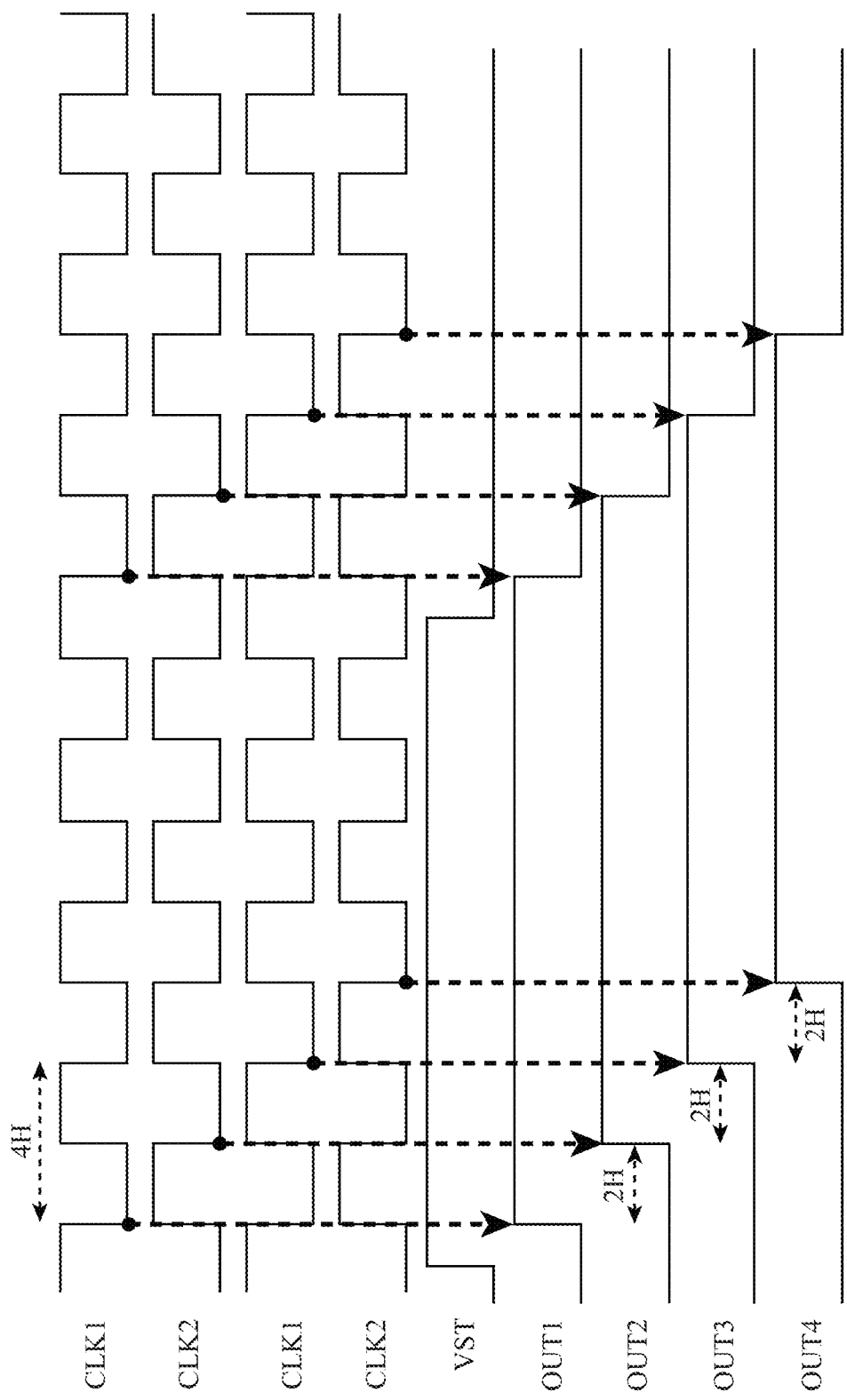

FIGS. 10A and 10B are timing diagrams showing different ways for operating the chain of gate driver circuits of the type described in connection with FIG. 9. In particular, the operation of FIG. 10A can be achieved by setting the value of the select signal SEL to the first value such that the complementary clock signals /CLK1 and /CLK2 are output from multiplexers 70-1 and 70-2. On the other hand, the operation of FIG. 10B can be achieved by setting the value of the select signal SEL to the second value such that the true clock signals CLK1 and CLK2 are output from multiplexers 70-1 and 70-2.

FIG. 10A illustrates a driving scheme where the clock signals CLK1 and CLK2 have a clock period of 8*H, where H represents a single row time. Gate start pulse VST may be pulsed high for two clock periods or 16H, from time t1 to t6 (as an example). As shown in FIG. 10A, the first gate output signal OUT1 may have a rising pulse edge that is trigged by a falling clock edge of CLK1 (at time t2). The second gate output signal OUT2 may have a rising pulse edge that is trigged by a rising clock edge of CLK2 (at time t3). The third gate output signal OUT3 may have a rising pulse edge that is trigged by a falling clock edge of /CLK1 (at time t4). The fourth gate output signal OUT4 may have a rising pulse edge that is trigged by a rising clock edge of /CLK2 (at time t5). Successive gate output signals may be delayed with respect to one another by 2*H since each gate driver circuit 50 in FIG. 9 needs to drive a pair of pixel rows.

The duration of each gate output signal pulse may be proportional or equal to the duration of the gate start pulse VST. The first gate output signal OUT1 may have a falling pulse edge that is trigged by a falling clock edge of CLK1 (at time t7). The second gate output signal OUT2 may have a falling pulse edge that is trigged by a rising clock edge of CLK2 (at time t8). The third gate output signal OUT3 may have a falling pulse edge that is trigged by a falling clock edge of /CLK1 (at time t9). The fourth gate output signal OUT4 may have a falling pulse edge that is trigged by a rising clock edge of /CLK2 (at time t10). The driving scheme can be similarly replicated for remaining pixels rows.

FIG. 10B illustrates a driving scheme where the clock signals CLK1 and CLK2 have a clock period of 4*H, where H represents a single row time. Gate start pulse VST may be pulsed high for four clock periods or 16H (as an example). Compared to the timing of FIG. 10A, the clock signals CLK1 and CLK2 of FIG. 10B exhibit twice the frequency, but the timing of the gate output signals OUT1-OUT4 remain the same. The timing of FIG. 10B can thus provide a more granular control while keeping the same 2H propagation between successive gate output signals. Compared to the timing of FIG. 10B, the timing of FIG. 10A can thus provide the same gate output waveforms with 50% lower power consumption.

Figure 11:
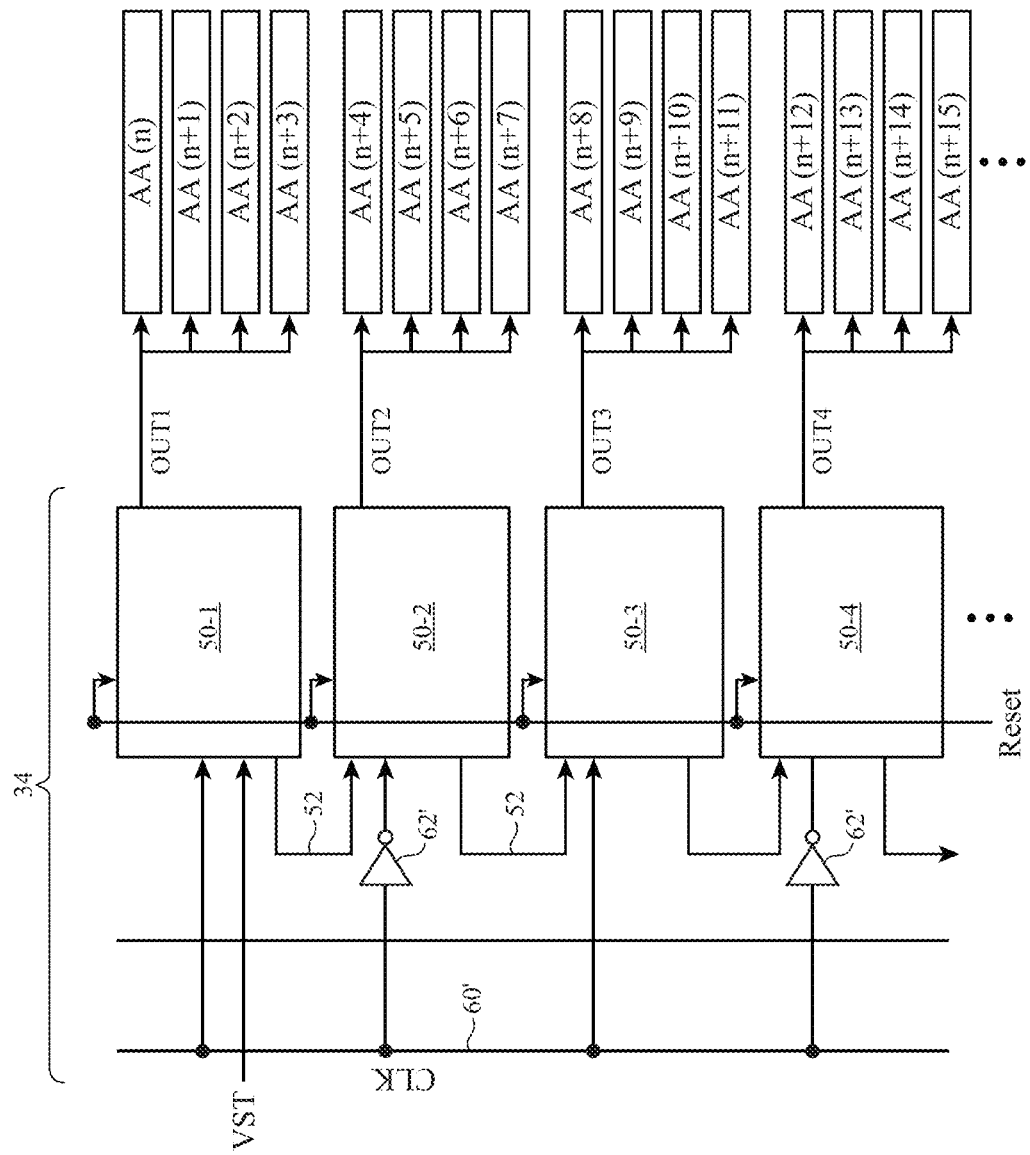
FIG. 11 is a diagram of an illustrative chain of gate driver circuits controlled by a single clock signal and an inverted version of the clock signal in accordance with some embodiments.

The embodiments described above in connection with FIGS. 3-10 in which gate driver circuitry 34 is configured to receive at least two clock signals CLK1 and CLK2 from the display driver circuitry are illustrative. FIG. 11 is a diagram of an illustrative gate driver circuitry 34 controlled by a single clock signal CLK and an inverted version of the clock signal (i.e., complementary clock signal /CLK). As shown in FIG. 11, gate driver circuitry 34 may include a chain of gate driver circuits 50, which include at least a first gate driver circuit 50-1 configured to generate OUT1, a second gate driver circuit 50-2 configured to generate OUT2, a third gate driver circuit 50-3 configured to generate OUT3, a fourth gate driver circuit 50-4 configured to generate OUT4, and so on all connected in series. Each output signal (e.g., a scan control signal, an emission control signal, or other row control signal) may control four rows of pixels in the active display area similar to the example of FIG. 5.

The gate driver circuits 50 may be coupled in series, as shown by series connection paths 52 in FIG. 11. In some configurations, a carry signal and/or a gate output signal may be conveyed from one gate driver circuit to the next via path 52. Furthermore, each gate driver circuit 50 in the chain can be configured to receive a reset signal via a reset control line 54. The reset signal may represent a global reset signal. The reset signal may be asserted to reset one or more nodes within each gate driver circuit 50 to ensure a proper power on and power off sequence (e.g., when powering on display 14 and when powering off display 14).

The first gate driver circuit 50-1 in the chain of gate drivers within circuitry 34 may receive a gate start pulse signal VST. The gate start pulse signal VST may trigger the generation and propagation of gate output signals down the chain of gate driver circuits. In the example of FIG. 11, gate driver circuitry 34 may receive only one clock signal CLK from display driver circuitry 30 (see, e.g., FIG. 2 via control path 38). Clock signal CLK may be provided on a clock signal line 60'. Clock signal line 60' may be a column line extending in a direction parallel to the chain of gate driver circuits (as an example). In particular, the first gate driver 50-1 may be configured to receive clock signal CLK directly from clock signal line 60'. The second gate driver 50-2 may be configured to receive an inverted version of clock signal CLK (e.g., /CLK) via a first inverter 62'. The third gate driver 50-3 may be configured to receive clock signal CLK directly from clock signal line 60'. The fourth gate driver 50-4 may be configured to receive /CLK via a second inverter 62'. Although only four gate driver circuits are shown in FIG. 11, gate driver circuitry 34 may include tens, hundreds, or thousands of gate driver circuits connected in a chain. The driving scheme for the other gate driver circuits in circuitry 34 can be repeated for the remaining rows.

Figure 12:
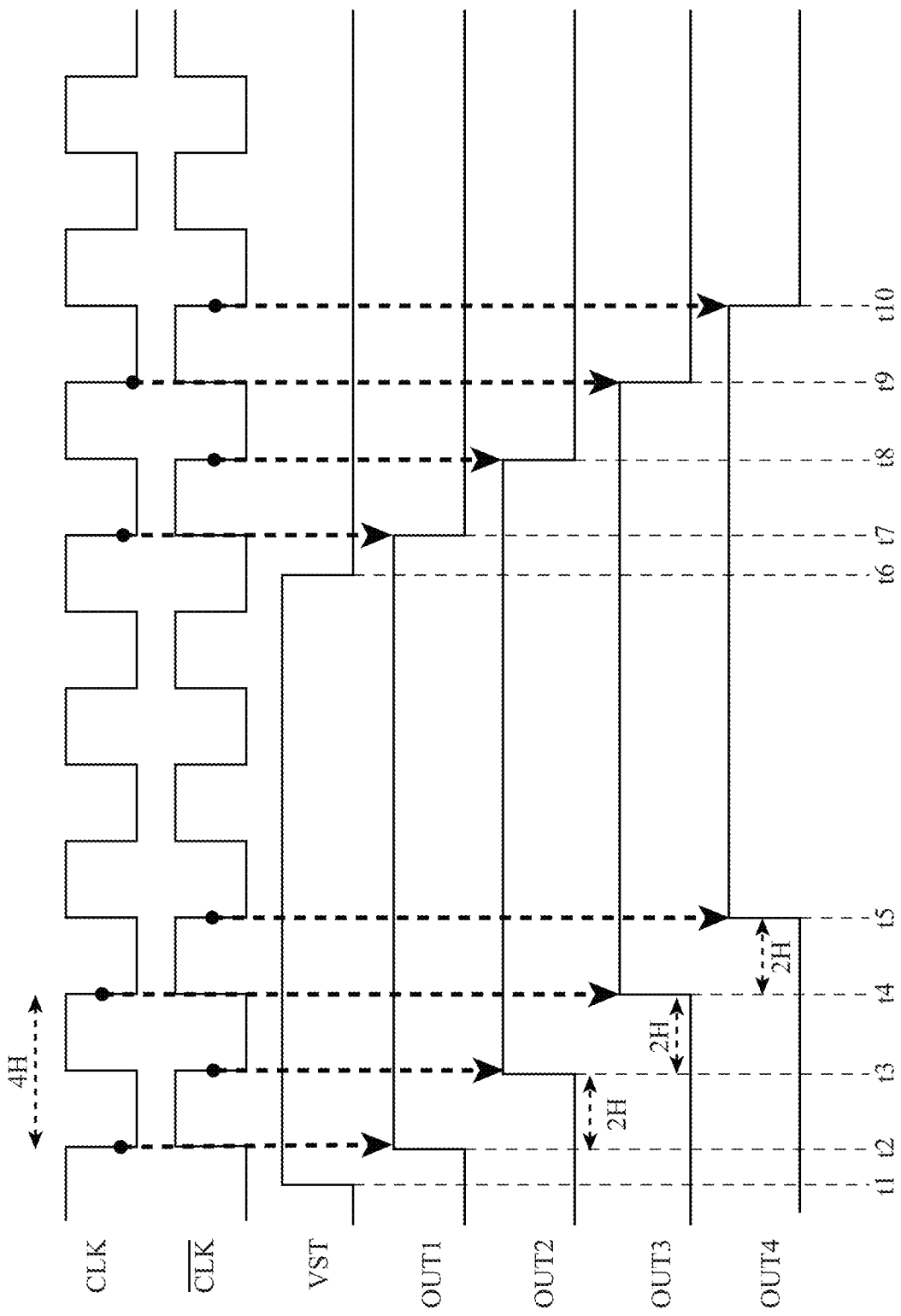
FIG. 12 is a timing diagram showing illustrative waveforms involved in operating the chain of gate driver circuits of the type shown in FIG. 11 in accordance with some embodiments.

FIG. 12 is a timing diagram showing illustrative waveforms involved in operating the chain of gate driver circuits of the type shown in FIG. 11. FIG. 12 illustrates a driving scheme where the single clock signal CLK has a clock period of 4*H, where H represents a single row time. Gate start pulse VST may be pulsed high for four clock periods or 16H, from time t1 to t6 (as an example). As shown in FIG. 12, the first gate output signal OUT1 may have a rising pulse edge that is trigged by a falling clock edge of CLK (at time t2). The second gate output signal OUT2 may have a rising pulse edge that is trigged by a falling clock edge of /CLK (at time t3). The third gate output signal OUT3 may have a rising pulse edge that is trigged by a falling clock edge of CLK (at time t4). The fourth gate output signal OUT4 may have a rising pulse edge that is trigged by a falling clock edge of /CLK (at time t5). Successive gate output signals may be delayed with respect to one another by 2*H.

The duration of each gate output signal pulse may be proportional or equal to the duration of the gate start pulse VST. The first gate output signal OUT1 may have a falling pulse edge that is trigged by a falling clock edge of CLK (at time t7). The second gate output signal OUT2 may have a falling pulse edge that is trigged by a falling clock edge of /CLK (at time t8). The third gate output signal OUT3 may have a falling pulse edge that is trigged by a falling clock edge of CLK (at time t9). The fourth gate output signal OUT4 may have a falling pulse edge that is trigged by a falling clock edge of /CLK (at time t10). The driving scheme can be similarly replicated for remaining pixels rows. Operating gate driver circuitry 34 in this way can help reduce power consumption.

Figure 14:
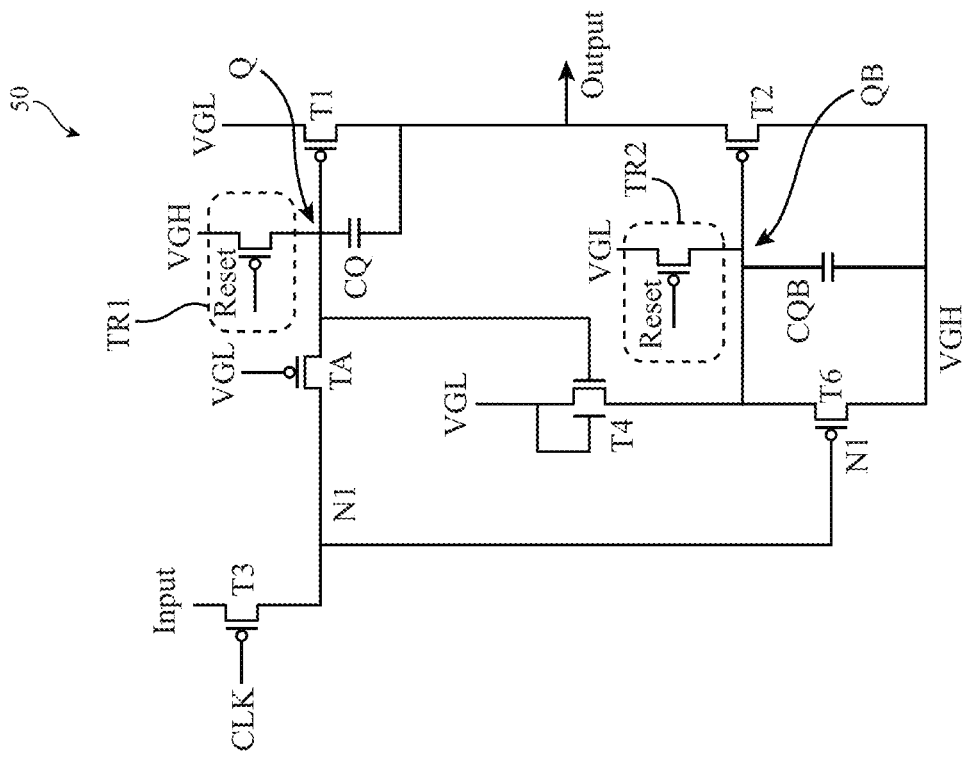
FIG. 14 is a circuit diagram of an illustrative gate driver circuit that includes capacitors, silicon transistors, and at least one semiconducting oxide transistor in accordance with some embodiments.
Figure 13:
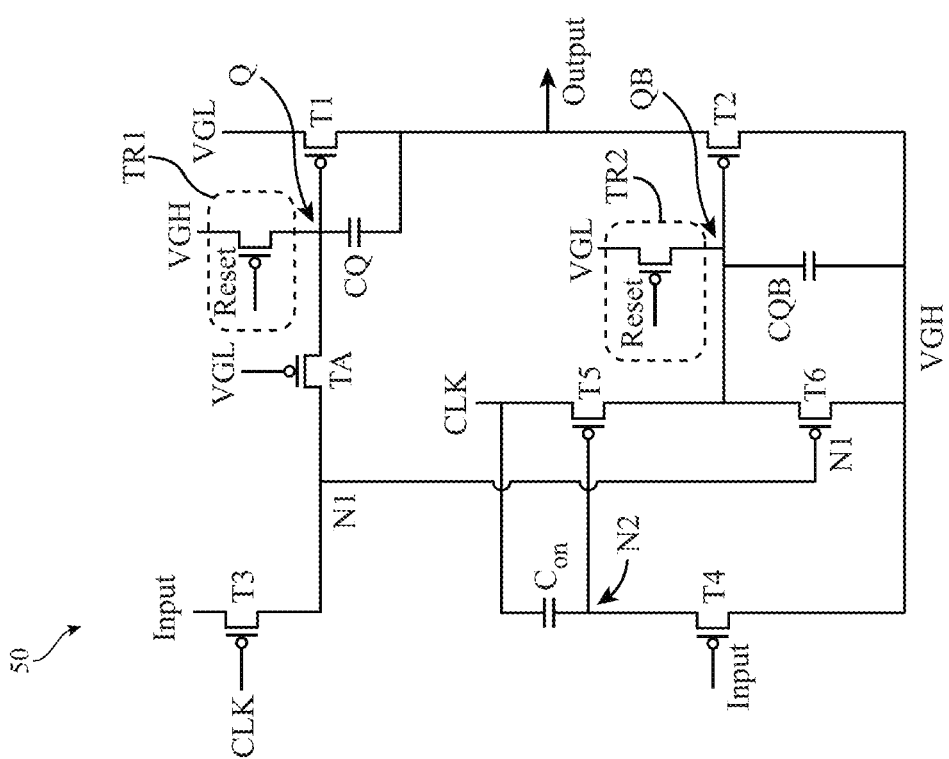
FIG. 13 is a circuit diagram of an illustrative gate driver circuit that includes only capacitors and silicon transistors in accordance with some embodiments.

FIGS. 13 and 14 are diagrams showing exemplary circuit implementations of gate driver circuit 50 of the type that can be included in the gate driver circuitry 34 shown in FIGS. 2-12. Gate driver circuit 50 can include silicon transistors and/or semiconducting oxide transistors. "Semiconducting oxide" transistors can be defined herein as thin-film transistors having a channel region formed from semiconducting oxide material (e.g., indium gallium zinc oxide or IGZO, indium tin zinc oxide or ITZO, indium gallium tin zinc oxide or IGTZO, indium tin oxide or ITO, or other semiconducting oxide material) and are generally n-type (n-channel) transistors. In contrast, "silicon transistors" can be defined herein as thin-film transistors having a channel region formed from silicon material such as polysilicon deposited using a low temperature process. Silicon transistors having such type of polysilicon active material deposited using a low temperature process are thus sometimes referred to as LTPS (low temperature polysilicon) transistors. Semiconducting oxide transistors generally exhibit lower leakage than silicon transistors.

The embodiment of gate driver 50 in FIG. 13 includes only capacitors and silicon transistors. As shown in FIG. 13, gate driver 50 can include capacitors CQ, CQB, and Con, and silicon transistors T1-T6, TR1-TR2, and TA (e.g., all p-type LTPS transistors). Transistor T1 may have a gate terminal coupled to node Q, a source terminal coupled to the gate output port (e.g., an output terminal on which the gate output signal is generated), and a drain terminal coupled to ground power supply voltage VGL. Transistor T2 may have a gate terminal coupled to node QB, a drain terminal coupled to the gate output port, and a source terminal coupled to positive power supply voltage VGH. Node QB generally exhibits a voltage that is opposite in polarity relative to the voltage at node Q (e.g., if node Q is high, then node QB is low, and vice versa). Ground power supply voltage VGL may be 0 V, −2 V, −4, −6V, less than −8 V, −10V, a low positive voltage, or any suitable ground or negative power supply voltage level. Positive power supply voltage VGH may be 3 V, 4 V, 5 V, 6 V, 7 V, 2 to 8 V, greater than 6 V, greater than 8 V, greater than 10 V, greater than 12 V, 6-12 V, 12-20 V, or any suitable positive power supply voltage level greater than VGL. The terms "source" and "drain" are sometimes used interchangeably when referring to current-conducting terminals of a thin-film transistor. The source and drain terminals are therefore sometimes referred to as "source-drain" terminals (e.g., a transistor has a gate terminal, a first source-drain terminal, and a second source-drain terminal).

Capacitor CQ may be coupled across the gate and source terminals of transistor T1. The first reset transistor TR1 may have a drain terminal coupled to node Q, a gate terminal configured to receive a global reset signal, and a source terminal coupled to positive power supply voltage VGH. Configured in this way, reset transistor TR1 can be activated to reset node Q to a high voltage level (e.g., by pulsing the reset signal low). Transistor TA may have a first source-drain terminal coupled to node Q, a second source-drain terminal coupled to an internal node N1, and a gate terminal coupled to ground voltage VGL. Transistor T3 may have a first source-drain terminal coupled to node N1, a second source-drain (input) terminal configured to receive a carry signal or a gate output signal from a preceding gate driver circuit 50, and a gate terminal configured to receive a clock signal (e.g., a true or complementary clock signal).

Capacitor CQB may be coupled across the gate and source terminals of transistor T2. The second reset transistor TR2 may have a source terminal coupled to node QB, a gate terminal configured to receive the global reset signal, and a drain terminal coupled to ground power supply voltage VGL. Configured in this way, reset transistor TR2 can be activated to reset node QB to a low voltage level (e.g., by pulsing the reset signal low). Transistor T6 may have a source terminal coupled to positive power supply voltage VGH, a gate terminal coupled to node N1, and a drain terminal coupled to node QB. Transistor T5 may have a source terminal coupled to node QB, a gate terminal coupled to an internal node N2, and a drain terminal configured to receive the clock signal (e.g., a true or complementary clock signal). Capacitor Con may be coupled across the gate and drain terminals of transistor T5. Transistor T4 may have a source terminal coupled to VGH, a drain terminal coupled to node N2, and a gate terminal configured to receive a carry signal or a gate output signal from a preceding gate driver circuit 50.

The structure of gate driver circuit 50 of FIG. 13 is exemplary. If desired, gate driver circuit 50 of FIG. 13 can include more than nine transistors, fewer than nine transistors, more than three capacitors, fewer than three capacitors, more than two reset transistors, only one reset transistor, optionally one or more n-type silicon transistors, and optionally one or more semiconducting oxide transistors. FIG. 14 shows another embodiment of a gate driver circuit 50 that can include a hybrid combination of both silicon transistors and at least one semiconducting oxide transistor.

As shown in FIG. 14, gate driver 50 can include capacitors CQ and CQB, silicon transistors T1-T3, T5, TR1-TR2, and TA (e.g., all p-type LTPS transistors), and a semiconducting oxide transistor T4. Transistor T1 may have a gate terminal coupled to node Q, a source terminal coupled to the gate output port (e.g., an output terminal on which the gate output signal is generated), and a drain terminal coupled to ground power supply voltage VGL. Transistor T2 may have a gate terminal coupled to node QB, a drain terminal coupled to the gate output port, and a source terminal coupled to positive power supply voltage VGH. Node QB generally exhibits a voltage that is opposite in polarity relative to the voltage at node Q (e.g., if node Q is high, then node QB is low, and vice versa).

Capacitor CQ may be coupled across the gate and source terminals of transistor T1. The first reset transistor TR1 may have a drain terminal coupled to node Q, a gate terminal configured to receive a global reset signal, and a source terminal coupled to positive power supply voltage VGH. Configured in this way, reset transistor TR1 can be activated to reset node Q to a high voltage level (e.g., by pulsing the reset signal low). Transistor TA may have a first source-drain terminal coupled to node Q, a second source-drain terminal coupled to an internal node N1, and a gate terminal coupled to ground voltage VGL. Transistor T3 may have a first source-drain terminal coupled to node N1, a second source-drain (input) terminal configured to receive a carry signal or a gate output signal from a preceding gate driver circuit 50, and a gate terminal configured to receive a clock signal (e.g., a true or complementary clock signal).

Capacitor CQB may be coupled across the gate and source terminals of transistor T2. The second reset transistor TR2 may have a source terminal coupled to node QB, a gate terminal configured to receive the global reset signal, and a drain terminal coupled to ground power supply voltage VGL. Configured in this way, reset transistor TR2 can be activated to reset node QB to a low voltage level (e.g., by pulsing the reset signal low). Transistor T5 may have a source terminal coupled to positive power supply voltage VGH, a gate terminal coupled to node N1, and a drain terminal coupled to node QB. Semiconducting oxide transistor T4 may have a front (top) gate terminal and optionally a back (bottom) gate terminal. In particular, transistor T4 may have a source terminal coupled to node QB, a drain terminal coupled to ground voltage VGL, a back (bottom) gate terminal also coupled to VGL, and a front (top) gate terminal coupled to node Q. Coupling the back gate terminal of semiconducting oxide transistor T4 to VGL in this way can help improve reliability.

The structure of gate driver circuit 50 of FIG. 14 is exemplary. If desired, gate driver circuit 50 of FIG. 14 can include more than eight transistors, fewer than eight transistors, more than two capacitors, fewer than two capacitors, more than two reset transistors, only one reset transistor, optionally one or more n-type silicon transistors, and optionally more than one semiconducting oxide transistors.

The embodiments described in connection with FIGS. 3-12 in which some of the gate driver circuits 50 receive the clock signals directly from one or more clock lines 60 while other gate driver circuits 50 receive an inverted version of the clock signals indirectly via one or more inverters 62 can sometimes result in mismatched rise and fall times for the clock signals arriving at the various gate driver circuits. The gate drivers configured to receive the clock signals directly from one or more clock lines 60 can sometimes be referred to and defined herein as "direct" gate driver stages, whereas the gate drivers configured to receive an inverted version of the clock signals via one or more inverters 62 can sometimes be referred to and defined herein as "indirect" gate driver stages. If care is not taken, the direct gate driver stages might receive clock signals having first rise and fall times, whereas the indirect gate driver stages might receive inverted clock signals having second rise and fall times that are different than the first rise and fall times. Such mismatch in rise and fall times can result in a luminance mismatch between pixel rows driven by the direct gate driver stages and pixel rows driven by the indirect gate driver stages.

Figure 15:
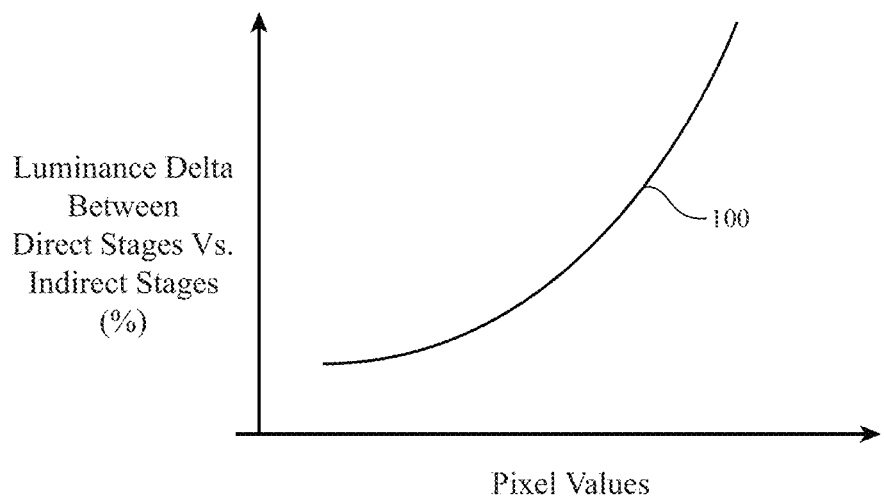
FIG. 15 plots luminance mismatch between gate driver circuits that directly receive clock signals and gate driver circuits that indirectly receive the clock signals via inverters in accordance with some embodiments.

FIG. 15 plots illustrative luminance mismatch between pixel rows that are driven by the direct gate driver stages and pixel rows that are driven by the indirect gate driver stages in accordance with some embodiments. As shown in FIG. 15, curve 100 represents the luminance mismatch in terms of percentage (%) as a function of display pixel values. The luminance mismatch is sometimes referred to as a "luminance delta" or "luminance error." In the example of FIG. 15, the amount of luminance delta might be low for pixel values near a first bound (e.g., for white or lighter pixels), whereas the amount of luminance delta might be higher for pixel values near a second bound (e.g., for black or darker pixels). This kind of luminance error relationship is exemplary. The luminance error/delta can have other suitable profiles.

Figure 16:
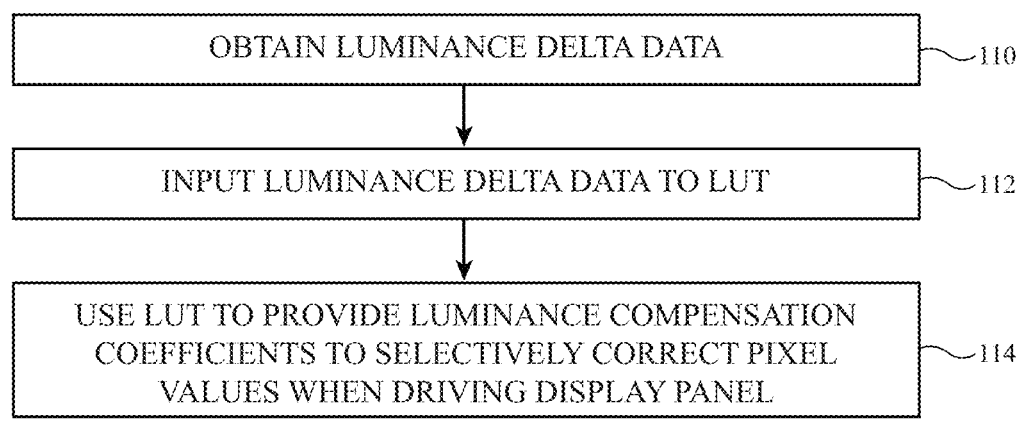
FIG. 16 is a flow chart of illustrative steps for compensating the luminance mismatch of the type shown in FIG. 15 in accordance with some embodiments.

FIG. 16 is a flow chart of illustrative steps for compensating the luminance mismatch of the type described in connection with FIG. 15. During the operations of block 110, luminance mismatch (delta) data can be obtained. For example, one or more calibration operations can be performed at the factory or in the field to obtain the luminance mismatch profile 100 of the type shown in FIG. 15.

During the operations of block 112, the luminance mismatch (delta) data can be input to a lookup table (LUT) in device. Such lookup table configured to store luminance mismatch data between rows driven by direct gate driver stages and rows driven by indirect gate driver stages is sometimes referred to as a luminance mismatch lookup table. The luminance mismatch lookup table can be stored as part of control circuitry 16 (see FIG. 1).

During the operations of block 114, the luminance mismatch lookup table can be configured to provide luminance compensation coefficients to selectively correct pixel values when driving the array of display pixels. The luminance compensation coefficients can be configured to reduce, eliminate, or mitigate the luminance delta between pixel rows exhibiting luminance mismatch based on the luminance mismatch data. For example, pixel rows driven by the direct gate driver stages can receive pixel values, from display driver circuitry 30, that are adjusted using a first set of luminance compensation coefficients, whereas pixel rows driven by the indirect gate driver stages can receive pixel values, from display driver circuitry 30, that are adjusted using a second set of luminance compensation coefficients different than the first set of luminance compensation coefficients. Configuring the display circuitry to operate in this way can be technically advantageous and beneficial to reduce potential luminance mismatch between the various pixel rows.

As described above, the luminance mismatch can be due to different rise and fall times of clock signals arriving at the direct gate driver stages versus the indirect gate driver stages. For example, the indirect gate driver stages can receive an inverted version of one or more clock signals via inverters. The inverters serve as an additional signal driving stage and can therefore provide clock signals with faster rise and/or fall times relative to the non-inverted clock signals arriving at the direct gate driver stages (e.g., the direct gate driver stages may receive clock signals with relatively slower rise and/or fall times).

Various ways for compensating such mismatch in rise/fall times can be provided. As an example, the rise/fall time mismatch can be mitigated by selectively adjusting the transistor sizing within each gate driver circuit. For gate driver circuits that need to have faster rise times, transistors associated with the pull-up drive-ability can be increased in sizing. For gate driver circuits that need to have slower rise times, transistors associated with the pull-up drive-ability can be decreased in sizing. For gate driver circuits that need to have faster fall times, transistors associated with the pull-down drive-ability can be increased in sizing. For gate driver circuits that need to have slower fall times, transistors associated with the pull-down drive-ability can be decreased in sizing.

As another example, the rise/fall time mismatch can be mitigated by adjusting the slew rate of the clock signals output from display driver circuitry 30. As another example, the rise/fall time mismatch can be mitigated by selectively adjusting the voltages within each gate driver circuit. For gate driver circuits that need to have faster rise/fall times, the positive and ground voltage rails powering those gate drivers can be widened (e.g., by locally increasing VGH and/or decreasing VGL). For gate driver circuits that need to have slower rise/fall times, the positive and ground voltage rails powering those gate drivers can be narrowed (e.g., by locally decreasing VGH and/or increasing VGL).

Figure 17:
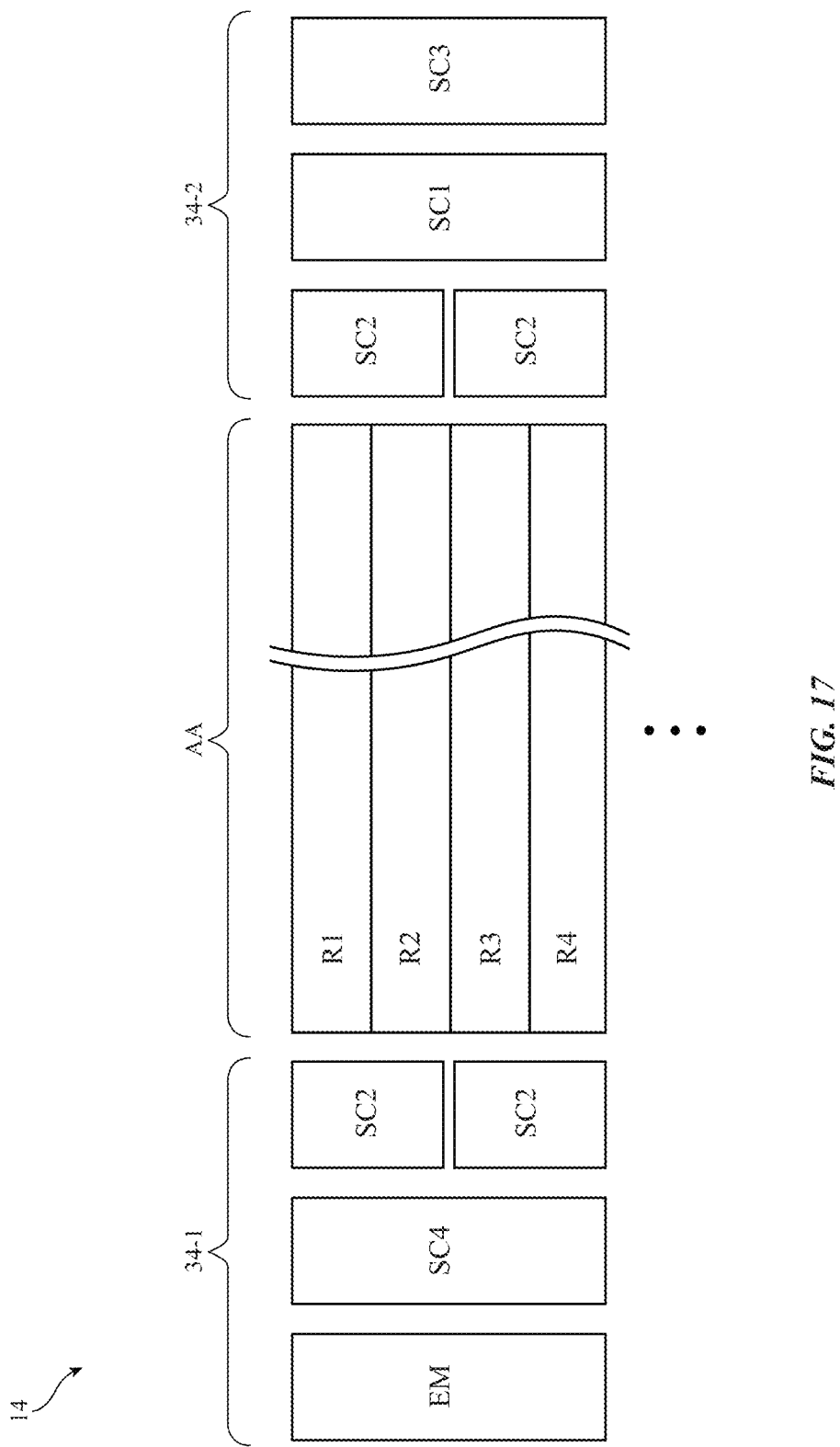
FIG. 17 is a top (plan) view of an illustrative display showing how an array of pixels can be driven using different types of gate driver circuits in accordance with some embodiments.

In general, each row of display pixels can be configured to receive any number of gate driver signals (e.g., a pixel can be configured to receive one or more emission signals, one or more scan signals, two or more scan signals, three or more scan signals, four or more scan signals, etc.). FIG. 17 shows a top (plan) view of an illustrative display 14 having an array of pixels driven using different types of gate driver circuits. As shown in FIG. 17, a first group of gate driver circuits 34-1 can be disposed along a first edge of the active display area AA, whereas a second group of gate driver circuits 34-2 can be disposed along a second edge, opposing the first edge, of the active area. This is exemplary. If desired, gate driver circuitry can be disposed along only one edge of the active display area or along three or more edges of the active area.

As shown in FIG. 17, a group of four pixel rows including a first pixel row R1, a second pixel row R2, a third pixel row R4, and a fourth pixel row R4 can be configured to receive a emission signal from a gate driver labeled EM within circuitry 34-1, to receive a first scan signal from a gate driver labeled SC1 within circuitry 34-2, to receive second scan signals from gate drivers labeled SC2 of circuitry 34-1 and circuitry 34-2, to receive a third scan signal from a gate driver labeled SC3 within circuitry 34-2, and to receive a fourth scan signal from a gate driver labeled SC4 within circuitry 34-1. In accordance with some embodiments, each of the different gate drivers can have different requirements. For example, some of the gate drivers might need high tuning resolution, whereas some of the gate drivers might only need low tuning resolution.

To accommodate these different requirements, the various gate drivers shown in FIG. 17 can be implemented using different types of gate driver circuits described in connection with FIGS. 3-14. Gate driver circuits can be considered to be different "types" if they receive a different number of clock signals (e.g., multiple clock signals CLK1 and CLK2 or a single clock signal as shown in FIG. 11), if they have different clock periods (e.g., a 4H clock period, an 8H clock period, a 16H clock period, or other clocking resolutions), whether or not they include multiplexers (see, e.g., multiplexers 70 in FIG. 9), etc. As an example, the EM gate driver might be implemented using a gate driver circuit driven in the way shown in FIG. 11. As another example, the SC1 and SC4 gate drivers might be implemented using gate driver circuits driven in the way shown in FIGS. 5 and 6B with an 8H clock period. As another example, the SC3 gate driver might be implemented using a gate driver circuit driven in the way shown in FIGS. 5 and 6A with an 16H clock period. As another example, the SC2 gate drivers might be implemented using gate drivers based on other types of gate driver circuits (see, e.g., gate drivers of the type shown in FIGS. 3, 7, 9, or other types of gate driver circuits).

Although only the driving of four row pixel rows is shown in FIG. 17, the gate driver circuitry for the remaining rows in the pixel array can be replicated across in a similar fashion. If desired, such configuration in which different types of gate drivers can be used to supply different row control signals to groups of two or more pixel rows, groups of three or more pixel rows, or groups of four or more pixel rows can be employed without departing from the scope of the present embodiments.

The foregoing is merely illustrative and various modifications can be made to the described embodiments. The foregoing embodiments may be implemented individually or in any combination.

What is claimed is:
1. A display comprising:
an array of pixels;
a first gate driver circuit configured to generate a first gate output signal that is conveyed to one or more rows of pixels in the array;
a second gate driver circuit configured to generate a second gate output signal that is conveyed to one or more rows of pixels in the array;
a first clock signal line through which a first clock signal is conveyed to the first gate driver circuit;
a first inverter configured to receive the first clock signal from the first clock signal line; and
a reset line on which a reset signal is provided, wherein the reset line is coupled to one or more reset transistors in the first gate driver circuit and is coupled to one or more reset transistors in the second gate driver circuit.

2. The display of claim 1, further comprising:
a second clock signal line on which a second clock signal is provided; and
a second inverter configured to receive the second clock signal from the second clock signal line.

3. The display of claim 2, wherein:
the second gate driver circuit has an input coupled to the first gate driver circuit; and
the second gate driver circuit is configured to receive an inverted version of the first clock signal from the first inverter.

4. The display of claim 3, further comprising:
a third gate driver circuit configured to generate a third gate output signal and having an input coupled to the second gate driver circuit, wherein the third gate driver circuit is configured to receive the second clock signal; and
a fourth gate driver circuit configured to generate a fourth gate output signal and having an input coupled to the third gate driver circuit, wherein the fourth gate driver is configured to receive an inverted version of the second clock signal from the second inverter.

5. The display of claim 4, wherein:
the first gate output signal is conveyed to first and second rows of pixels in the array;
the second gate output signal is conveyed to third and fourth rows of pixels in the array;
the third gate output signal is conveyed to fifth and sixth rows of pixels in the array; and
the fourth gate output signal is conveyed to seventh and eighth rows of pixels in the array.

6. The display of claim 4, wherein:
the first gate output signal is conveyed to a first group of four rows of pixels in the array;
the second gate output signal is conveyed to a second group of four rows of pixels in the array;
the third gate output signal is conveyed to a third group of four rows of pixels in the array; and
the fourth gate output signal is conveyed to a fourth group of four rows of pixels in the array.

7. The display of claim 2, wherein:
the second gate driver circuit has an input coupled to the first gate driver circuit; and
the second gate driver circuit is configured to receive the second clock signal.

8. The display of claim 7, further comprising:
a third gate driver circuit configured to generate a third gate output signal and having an input coupled to the second gate driver circuit, wherein the third gate driver circuit is configured to receive an inverted version of the first clock signal from the first inverter; and
a fourth gate driver circuit configured to generate a fourth gate output signal and having an input coupled to the third gate driver circuit, wherein the fourth gate driver is configured to receive an inverted version of the second clock signal from the second inverter.

9. The display of claim 8, wherein:
the first gate output signal is conveyed to first and second rows of pixels in the array;
the second gate output signal is conveyed to third and fourth rows of pixels in the array;
the third gate output signal is conveyed to fifth and sixth rows of pixels in the array; and
the fourth gate output signal is conveyed to seventh and eighth rows of pixels in the array.

10. The display of claim 7, further comprising:
a third gate driver circuit configured to generate a third gate output signal and having an input coupled to the second gate driver circuit;
a fourth gate driver circuit configured to generate a fourth gate output signal and having an input coupled to the third gate driver circuit; and
a first multiplexer having a first input configured to receive an inverted version of the first clock signal from the first inverter, a second input configured to receive the first clock signal, and an output coupled to the third gate driver circuit.

11. The display of claim 10, further comprising:
a second multiplexer having a first input configured to receive an inverted version of the second clock signal from the second inverter, a second input configured to receive the second clock signal, and an output coupled to the fourth gate driver circuit.

12. The display of claim 3, wherein:
the one or more rows of pixels configured to receive the first gate output signal are further configured to receive pixel values adjusted based on a first set of luminance compensation coefficients; and
the one or more rows of pixels configured to receive the second gate output signal are further configured to receive pixel values adjusted based on a second set of luminance compensation coefficients different than the first set of luminance compensation coefficients.

13. A method of operating a display, comprising:
with an array of pixels, displaying image content;
with a first gate driver, outputting a first gate output signal to one or more rows of pixels in the array;
with a second gate driver, outputting a second gate output signal to one or more rows of pixels in the array;
with the first gate driver, receiving a first clock signal;
with a first inverter, receiving the first clock signal and outputting an inverted version of the first clock signal;
with a falling clock edge of the first clock signal, triggering assertion of the first gate output signal; and
with a falling clock edge of the inverted version of the first clock signal, triggering assertion of the second gate output signal.

14. The method of claim 13, further comprising:
with the second gate driver, receiving the inverted version of the first clock signal from the first inverter.

15. The method of claim 13, further comprising:
with a third gate driver, outputting a third gate output signal to one or more rows of pixels in the array;
with a fourth gate driver, outputting a fourth gate output signal to one or more rows of pixels in the array;
with the third gate driver, receiving a second clock signal; and
with a second inverter, receiving the second clock signal and outputting an inverted version of the second clock signal to the fourth gate driver.

16. The method of claim 13, further comprising:
with a third gate driver, outputting a third gate output signal to one or more rows of pixels in the array;
with a fourth gate driver, outputting a fourth gate output signal to one or more rows of pixels in the array; and
with a multiplexer, receiving the inverted version of the first clock signal, receiving the first clock signal, and outputting either the inverted version of the first clock signal or the first clock signal to the third gate driver.

17. The method of claim 13, further comprising:
providing a reset signal to one or more reset transistors in the first gate driver; and providing the reset signal one or more reset transistors in the second gate driver.

18. A display comprising:
an array of pixels; and
gate driver circuitry configured to receive only one clock signal, wherein the gate driver circuitry comprises:
  a first gate driver circuit configured to generate a first gate output signal that is conveyed to one or more rows of pixels in the array, wherein the first gate driver circuit is configured to receive the clock signal;
  an inverter configured to receive the clock signal and to generate an inverted clock signal; and
  a second gate driver circuit configured to generate a second gate output signal that is conveyed to one or more rows of pixels in the array, wherein the second gate driver circuit is configured to receive the inverted clock signal.

19. The display of claim 18, wherein:
the first gate output signal is conveyed to a first group of four rows of pixels in the array; and
the second gate output signal is conveyed to a second group of four rows of pixels in the array.

20. The display of claim 18, further comprising:
a reset control line configured to convey a global reset signal simultaneously to the first and second gate driver circuits.

21. A display comprising:
an array of pixels; and
a first gate driver circuit of a first type configured to output a first gate output signal to at least one row of pixels in the array; and
a second gate driver circuit of a second type, different than the first type, configured to output a second gate output signal to the at least one row of pixels in the array, wherein:
  the first gate driver circuit of the first type is configured to receive a first number of clock signals having a first clock period; and
  the second gate driver circuit of the second type is configured to receive a second number of clock signals, different than the first number of clock signals, having a second clock period different than the first clock period.

* * * * *